United States Patent
Hayashi

(10) Patent No.: US 10,192,318 B2
(45) Date of Patent: Jan. 29, 2019

(54) TRACKING SYSTEM, TERMINAL DEVICE, CAMERA DEVICE, TRACKING IMAGING METHOD, AND PROGRAM

(71) Applicant: FUJIFILM Corporation, Tokyo (JP)

(72) Inventor: Daisuke Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 1 day.

(21) Appl. No.: 15/666,019

(22) Filed: Aug. 1, 2017

(65) Prior Publication Data

US 2017/0330335 A1    Nov. 16, 2017

Related U.S. Application Data

(63) Continuation of application No. PCT/JP2015/083599, filed on Nov. 30, 2015.

(30) Foreign Application Priority Data

Feb. 2, 2015    (JP) .................................. 2015-018642

(51) Int. Cl.
    *G06T 7/00*    (2017.01)
    *G06T 7/246*   (2017.01)
    (Continued)

(52) U.S. Cl.
    CPC ............ *G06T 7/246* (2017.01); *G03B 17/561* (2013.01); *G06T 1/20* (2013.01); *G06T 7/74* (2017.01);
    (Continued)

(58) Field of Classification Search
    CPC .................................. G06T 7/246; G06T 7/74
    (Continued)

(56) References Cited

U.S. PATENT DOCUMENTS

| | | | |
|---|---|---|---|
| 2010/0097470 A1 | 4/2010 | Yoshida et al. | |
| 2010/0284568 A1 | 11/2010 | Tojo | |
| 2012/0268608 A1* | 10/2012 | Watanabe | H04N 5/232 348/169 |

FOREIGN PATENT DOCUMENTS

| | | | |
|---|---|---|---|
| JP | 2003-274390 A | 9/2003 | |
| JP | 2010-263581 A | 11/2010 | |
| | (Continued) | | |

OTHER PUBLICATIONS

International Preliminary Report on Patentability and Written Opinion of the International Searching Authority (Forms PCT/IB/326, PCT/IB/373 and PCT/ISA/237) issued in International Application No. PCT/JP2015/083599 dated Aug. 17, 2017, together with an English translation.

(Continued)

*Primary Examiner* — Jeffery A Williams
(74) *Attorney, Agent, or Firm* — Birch, Stewart, Kolasch & Birch, LLP

(57) ABSTRACT

In a preferred aspect of the present invention, at least one of a camera-side controller or a terminal-side controller performs a tracking image generation process (P1) of generating tracking image data from captured image data. Further, at least one of the camera-side controller or the terminal-side controller performs a tracking calculation process (P2) of acquiring target information on the basis of the tracking image data. The tracking image data includes a high-resolution region with relatively higher resolution and a low-resolution region with relatively lower resolution. In the tracking image generation process (P1), basic tracking information including information on at least one of a size or a speed of the tracking target is acquired, and a high-resolution region and a low-resolution region are determined on the basis of the basic tracking information. The tracking (Continued)

image generation process (P1) and the tracking calculation process (P2) are performed in parallel.

11 Claims, 15 Drawing Sheets

(51) Int. Cl.
    *H04N 5/225*     (2006.01)
    *H04N 5/232*     (2006.01)
    *G06T 7/73*     (2017.01)
    *G06T 1/20*     (2006.01)
    *G03B 17/56*     (2006.01)
    *H04N 7/18*     (2006.01)

(52) U.S. Cl.
    CPC ............. *H04N 5/225* (2013.01); *H04N 5/232* (2013.01); *H04N 5/23203* (2013.01); *H04N 5/23206* (2013.01); *H04N 5/23296* (2013.01); *H04N 7/188* (2013.01); *G03B 2206/00* (2013.01); *G06T 2207/20016* (2013.01)

(58) Field of Classification Search
    USPC .......................................................... 348/169
    See application file for complete search history.

(56) References Cited

FOREIGN PATENT DOCUMENTS

| | | |
|---|---|---|
| JP | 2012-227737 A | 11/2012 |
| JP | 2014-39165 A | 2/2014 |
| JP | 2014-39166 A | 2/2014 |
| JP | 2014-216694 A | 11/2014 |
| WO | WO 2008/035745 A1 | 3/2008 |

OTHER PUBLICATIONS

International Search Report (Form PCT/ISA/210) issued in International Application No. PCT/JP2015/083599 dated Feb. 16, 2016.
Japanese Decision to Grant a Patent for Japanese Application No. 2016-573190, dated Jul. 10, 2018, with Machine Translation.

* cited by examiner

FIG. 1
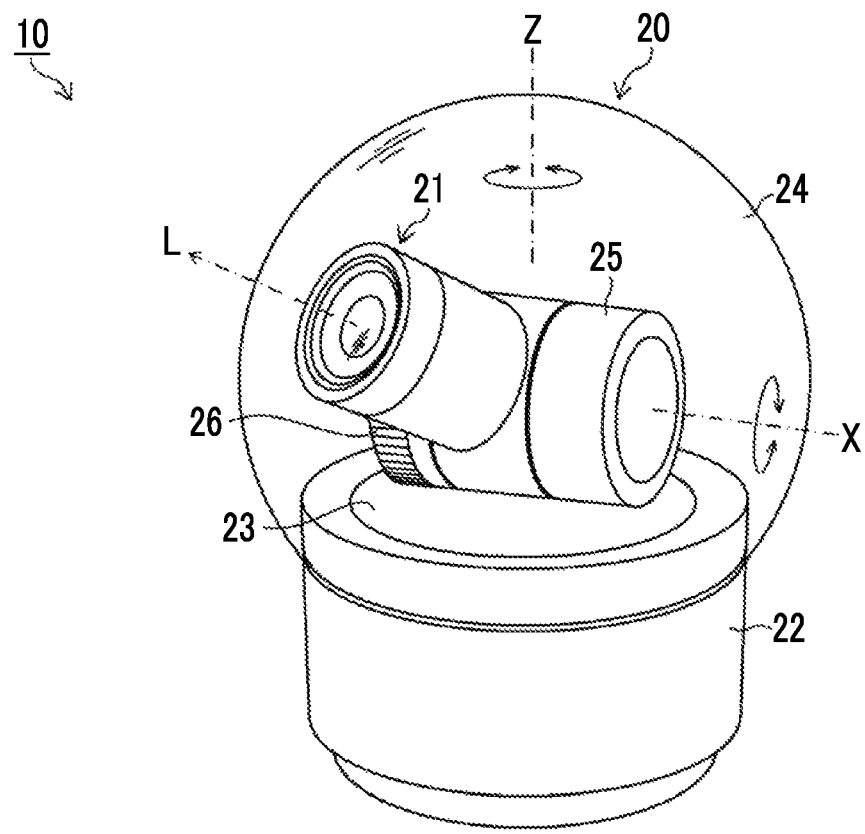
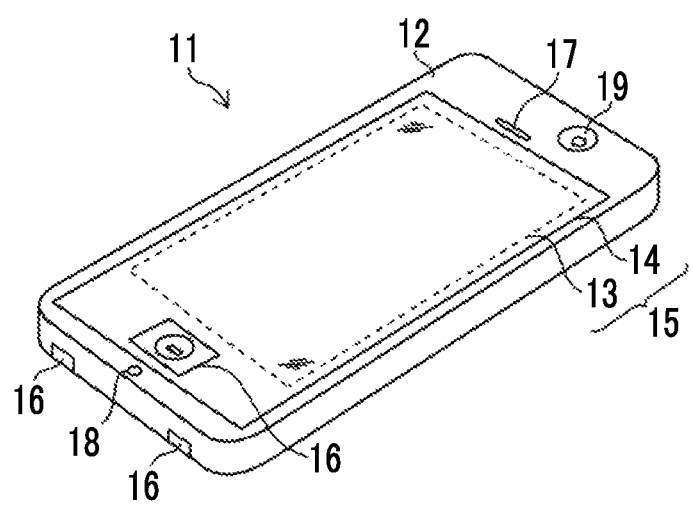

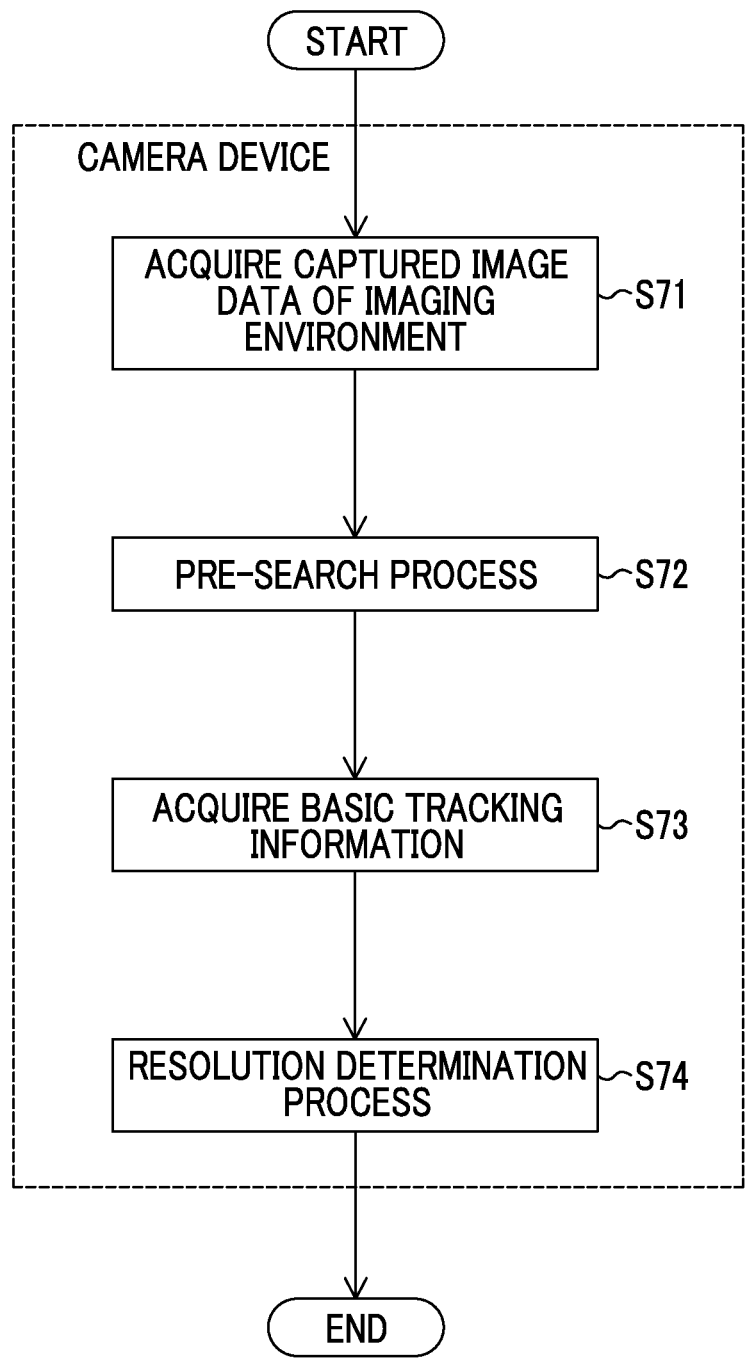

ent application is a Continuation of PCT International Application No. PCT/JP2015/083599 filed on Nov. 30, 2015 claiming priority under 35 U.S.C §119(a) to Japanese Patent Application No. 2015-18642 filed on Feb. 2, 2015. Each of the above applications is hereby expressly incorporated by reference, in their entirety, into the present application.

BACKGROUND OF THE INVENTION

1. Field of the Invention

The present invention relates to a tracking system that acquires a position of a tracking target on the basis of tracking image data of which resolution is adjusted, a terminal device, a camera device, a tracking imaging method, and a program.

2. Description of the Related Art

A tracking imaging technology for continuously performing imaging while tracking a specific subject is widely used in the field of a monitoring camera, a general digital camera, or the like. Various methods have been proposed as schemes of specifying a position of a specific subject serving as a tracking target. For example, a method of specifying the position of the tracking target in an image by collating a feature of the tracking target with a captured image is known.

From the viewpoint of improvement of a recognition rate of a tracking target, it is preferable to specify a position of the tracking target on the basis of the high resolution image, but generally, as resolution of an image increases, a processing load increases. Therefore, even in a case where a position of the tracking target is specified using an image with high resolution, a delay occurs in an image analysis process in a tracking system in which capability of a process of analyzing such a high resolution image is insufficient, and as a result, tracking accuracy may be degraded. In particular, in a case where a motion of the tracking target is fast, adverse effects on a tracking process as well as a process other than the tracking process, such as a tendency of long time required for the process due to an increasing amount of process calculation, and a decreasing frame rate of a captured image, are assumed.

Under such circumstances, in the imaging device with a tracking function disclosed in JP2014-216694A, high-resolution processing is performed on only a tracking target object and the inside of a tracking frame formed around the tracking target, and a position of the tracking target is specified on the basis of an image on which the high-resolution processing has been performed.

SUMMARY OF THE INVENTION

As described above, the image data suitable for a tracking process (hereinafter also referred to as "tracking image data") is generated from captured image data and the position of the tracking target is specified on the basis of the tracking image data, making it possible to perform a tracking process adapted to a processing capacity of the tracking system.

However, in a case where the position of the tracking target is specified on the basis of the tracking image data, a process of generating the tracking image data is necessary and the number of process steps increases, as compared with a case where the position of the tracking target is specified on the basis of the captured image data.

In particular, in a case where resolution of the tracking image data is adjusted according to the position of the tracking target as in the imaging device of JP2014-216694A, it is necessary to perform a "process of generating tracking image data according to a position of a tracking target" after a "process of specifying a position of a tracking target on the basis of tracking image data". Further, it is necessary to perform the "process of specifying the position of the tracking target on the basis of the tracking image data" after the "process of generating tracking image data according to the position of the tracking target". Thus, in a case where the "process of specifying the position of the tracking target" and the "process of generating the tracking image data" are executed in series, if a delay occurs during the process, tracking accuracy is degraded due to an influence of the delay on the other entire process in a subsequent step.

The present invention has been made in view of the above circumstances, and an object thereof is to provide a technology capable of speeding up a process of tracking-imaging a tracking target while ensuring good tracking accuracy.

An aspect of the present invention relates to a tracking system, comprising: a camera device including an imaging unit that acquires captured image data, an imaging direction adjustment unit that adjusts an imaging direction of the imaging unit, a camera-side controller that controls the imaging direction adjustment unit on the basis of target information indicating a position of a tracking target, and a camera-side communication unit that is connected to the camera-side controller; and a terminal device including a terminal-side communication unit that is able to communicate with the camera-side communication unit, a terminal-side controller that is connected to the terminal-side communication unit, and a user interface that is connected to the terminal-side controller, in which at least one of the camera-side controller or the terminal-side controller performs a tracking image generation process of generating tracking image data from the captured image data, at least one of the camera-side controller or the terminal-side controller performs a tracking calculation process of acquiring the target information on the basis of the tracking image data, the tracking image data is data of an image including a high-resolution region with relatively higher resolution and a low-resolution region with relatively lower resolution, in the tracking image generation process, basic tracking information including information on at least one of a size or a speed of the tracking target is acquired, the high-resolution region and the low-resolution region are determined on the basis of the basic tracking information, and the tracking image data is generated, and the tracking image generation process and the tracking calculation process are performed in parallel.

According to this aspect, since the tracking image data is generated on the basis of information on at least one of the size or the speed of the tracking target, and the tracking image generation process and the tracking calculation process are performed in parallel, it is possible to effectively speed up a process of tracking-imaging the tracking target while ensuring good tracking accuracy.

Preferably, at least a portion of the tracking calculation process of acquiring the target information indicating the position of the tracking target at a first timing on the basis of the tracking image data generated from the captured image data acquired at the first timing is performed simultaneously with at least a portion of the tracking image generation process of generating the tracking image data that is used to acquire the target information indicating the position of the tracking target at a second timing after the first timing, from the captured image data acquired at the second timing.

According to this aspect, at least a portion of the tracking calculation process of acquiring the target information indicating the position of the tracking target at the first timing is performed simultaneously with at least a portion of the tracking image generation process of generating the tracking image data that is used to acquire target information indicating the position of the tracking target at the second timing, making it possible to speed up a process for tracking-imaging the tracking target.

The "tracking calculation process of acquiring target information indicating the position of the tracking target at the first timing" and the "tracking image generation process of generating the tracking image data that is used to acquire target information indicating the position of the tracking target at the second timing" may be started at the same time, and one of the processes may be started after the start of the other of processes and before completion of the other of the process.

Preferably, the tracking image generation process and the tracking calculation process are performed in one of the camera-side controller and the terminal-side controller.

According to this aspect, the tracking image generation process and the tracking calculation process are performed in one of the camera-side controller and the terminal-side controller, making it possible to simplify a processing flow of the tracking image generation process and the tracking calculation process.

Preferably, one of the tracking image generation process and the tracking calculation process is performed in one of the camera-side controller and the terminal-side controller, and the other of the tracking image generation process and the tracking calculation process is performed in the other of the camera-side controller and the terminal-side controller.

According to this aspect, the tracking image generation process and the tracking calculation process are performed in a distributed manner by the camera-side controller and the terminal-side controller, making it possible to effectively utilize resources.

Preferably, the tracking calculation process is performed by both of the camera-side controller and the terminal-side controller, and a controller having a relatively higher processing capability between the camera-side controller and the terminal-side controller performs the tracking calculation process of the high-resolution region, and a controller having a relatively lower processing capability between the camera-side controller and the terminal-side controller performs the tracking calculation process of the low-resolution region.

According to this aspect, the tracking calculation process of the high-resolution region and the tracking calculation process of the low-resolution region can be performed efficiently according to processing capacity of the camera-side controller and the terminal-side controller.

Preferably, at least one of the camera-side controller or the terminal-side controller performs a pre-search process of acquiring a spatial frequency of the captured image data of at least a portion of the imaging range of the camera device, and in the tracking image generation process, resolution of the tracking image data is determined on the basis of the spatial frequency acquired through the pre-search process.

According to this aspect, it is possible to adaptively determine the resolution of the tracking image data on the basis of the spatial frequency of at least a portion of the imaging range of the camera device, and it is possible to reduce a processing load according to an imaging environment.

Preferably, in the tracking image generation process, in a case where the spatial frequency acquired through the pre-search process is relatively low, the resolution of the tracking image data is set to be lower than that in a case where the spatial frequency is relatively high.

According to this aspect, in a case where the spatial frequency of at least a portion of the imaging range of the camera device is relatively low, it is possible to reduce a processing load and speed up the process of tracking-imaging the tracking target in comparison with the case where the spatial frequency of the at least a portion of the imaging range is relatively high.

Another aspect of the present invention relates to a terminal device that is connectable to a camera device including an imaging unit that acquires captured image data, an imaging direction adjustment unit that adjusts an imaging direction of the imaging unit, a camera-side controller that controls the imaging direction adjustment unit on the basis of target information indicating a position of a tracking target, and a camera-side communication unit that is connected to the camera-side controller, the terminal device comprising: a terminal-side communication unit that is able to communicate with the camera-side communication unit; a terminal-side controller that is connected to the terminal-side communication unit; and a user interface connected to the terminal-side controller, in which at least one of the camera-side controller or the terminal-side controller performs a tracking image generation process of generating tracking image data from the captured image data, the terminal-side controller performs a tracking calculation process of acquiring the target information on the basis of the tracking image data, and transmits the target information to the camera-side controller via the terminal-side communication unit and the camera-side communication unit, the tracking image data is data of an image including a high-resolution region with relatively higher resolution and a low-resolution region with relatively lower resolution, in the tracking image generation process, basic tracking information including information on at least one of a size or a speed of the tracking target is acquired, the high-resolution region and the low-resolution region are determined on the basis of the basic tracking information, and the tracking image data is generated, and the tracking image generation process and the tracking calculation process are performed in parallel.

According to this aspect, since the tracking image data is generated on the basis of information on at least one of the size or the speed of the tracking target, and the tracking image generation process and the tracking calculation process are performed in parallel, it is possible to effectively speed up a process of tracking-imaging the tracking target while ensuring good tracking accuracy.

Another aspect of the present invention relates to a camera device connectable to a terminal device including a terminal-side communication unit, a terminal-side controller that is connected to the terminal-side communication unit, and a user interface that is connected to the terminal-side controller, the camera device comprising: an imaging unit that acquires the captured image data; an imaging direction adjustment unit that adjusts an imaging direction of the imaging unit; and a camera-side controller that controls the imaging direction adjustment unit on the basis of target information indicating a position of the tracking target, the camera-side controller performing a tracking image generation process of generating tracking image data from the captured image data and a tracking calculation process of acquiring the target information on the basis of the tracking image data in parallel, in which the tracking image data is data of an image including a high-resolution region with relatively higher resolution and a low-resolution region with relatively lower resolution, and in the tracking image generation process, basic tracking information including information on at least one of a size or a speed of the tracking target is acquired, the high-resolution region and the low-resolution region are determined on the basis of the basic tracking information, and the tracking image data is generated.

According to this aspect, since the tracking image data is generated on the basis of information on at least one of the size or the speed of the tracking target, and the tracking image generation process and the tracking calculation process are performed in parallel, it is possible to effectively speed up a process of tracking-imaging the tracking target while ensuring good tracking accuracy.

Still another aspect of the present invention relates to a tracking imaging method of a tracking system comprising a camera device including an imaging unit that acquires captured image data, an imaging direction adjustment unit that adjusts an imaging direction of the imaging unit, a camera-side controller that controls the imaging direction adjustment unit on the basis of target information indicating a position of a tracking target, and a camera-side communication unit that is connected to the camera-side controller, and a terminal device including a terminal-side communication unit that is able to communicate with the camera-side communication unit, a terminal-side controller that is connected to the terminal-side communication unit, and a user interface that is connected to the terminal-side controller, the tracking imaging method comprising: a step of performing a tracking image generation process of generating tracking image data from the captured image data by at least one of the camera-side controller or the terminal-side controller; and a step of performing a tracking calculation process of acquiring the target information on the basis of the tracking image data by at least one of the camera-side controller or the terminal-side controller, in which the tracking image data is data of an image including a high-resolution region with relatively higher resolution and a low-resolution region with relatively lower resolution, in the tracking image generation process, basic tracking information including information on at least one of a size or a speed of the tracking target is acquired, the high-resolution region and the low-resolution region are determined on the basis of the basic tracking information, and the tracking image data is generated, and the tracking image generation process and the tracking calculation process are performed in parallel.

Still another aspect of the present invention relates to a program for controlling a tracking system comprising a camera device including an imaging unit that acquires captured image data, an imaging direction adjustment unit that adjusts an imaging direction of the imaging unit, a camera-side controller that controls the imaging direction adjustment unit on the basis of target information indicating a position of a tracking target, and a camera-side communication unit that is connected to the camera-side controller, and a terminal device including a terminal-side communication unit that is able to communicate with the camera-side communication unit, a terminal-side controller that is connected to the terminal-side communication unit, and a user interface that is connected to the terminal-side controller, the program causing a computer to execute: a step of performing a tracking image generation process of generating tracking image data from the captured image data by at least one of the camera-side controller or the terminal-side controller; and a step of performing a tracking calculation process of acquiring the target information on the basis of the tracking image data by at least one of the camera-side controller or the terminal-side controller, in which the tracking image data is data of an image including a high-resolution region with relatively higher resolution and a low-resolution region with relatively lower resolution, in the tracking image generation process, basic tracking information including information on at least one of a size or a speed of the tracking target is acquired, the high-resolution region and the low-resolution region are determined on the basis of the basic tracking information, and the tracking image data is generated, and the tracking image generation process and the tracking calculation process are performed in parallel.

According to the present invention, since the tracking image data is generated on the basis of information on at least one of the size or the speed of the tracking target, and the tracking image generation process and the tracking calculation process are performed in parallel, it is possible to effectively speed up a process of tracking-imaging the tracking target while ensuring good tracking accuracy.

BRIEF DESCRIPTION OF THE DRAWINGS

FIG. 1 is an external perspective view illustrating an example applicable to a tracking system of the present invention.

FIG. 17 is a diagram illustrating an example of a process flow from a pre-search process to a resolution determination process according to a seventh embodiment.

DESCRIPTION OF THE PREFERRED EMBODIMENTS

Figure 2:
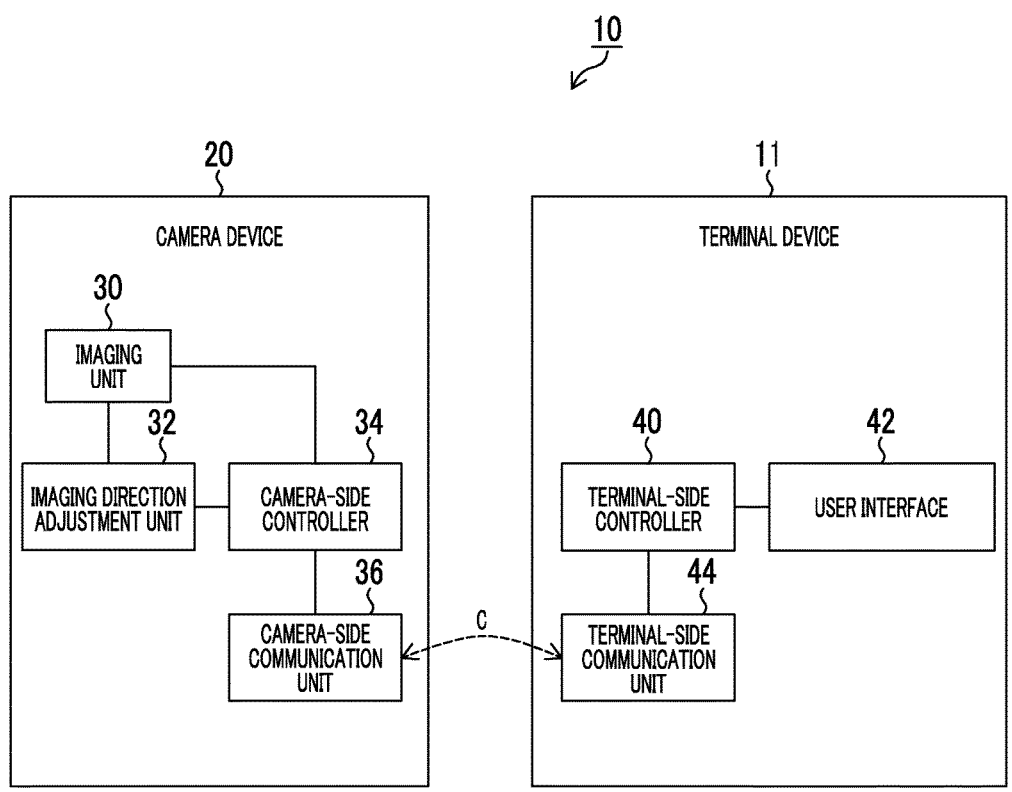
FIG. 2 is a block diagram illustrating an example of function related to tracking imaging in a functional configuration of the tracking system.

FIG. 1 is an external perspective view illustrating an example of a tracking system 10 to which the present invention is applicable.

The tracking system 10 of this example includes a terminal device 11 having a form of a smart phone, and a camera device 20 that has a form of a pan and tilt camera system and is connectable to the terminal device 11.

In the camera device 20, a holding unit 25 including a gear 26 and an imaging optical system 21 attached to the holding unit 25 are fixedly mounted on a pedestal 23 provided on a device main body 22. The pedestal 23 is provided to be rotatable about an axis Z in a vertical direction of the device main body 22, and a panning motion around the axis Z in the vertical direction is performed by a pan driving unit (not illustrated). The gear 26 is provided coaxially with a horizontal axis X. When driving force is transmitted from a tilt driving unit (not illustrated) via the gear 26, the imaging optical system 21 is moved rotationally in a vertical direction and a tilting operation is performed. The imaging optical system 21, the holding unit 25 (the gear 26), and the pedestal 23 are covered with a dustproof and drip-proof dome cover 24. In FIG. 1, an optical axis of the imaging optical system 21 is denoted with a reference sign "L".

Meanwhile, a display 13, an operation panel 14, an operation button 16, a speaker 17, a microphone 18, and a terminal camera 19 are accommodated in a housing 12 of the terminal device 11 of this example. The display 13 functions as a display unit that displays an image or various types of information transmitted from the camera device 20, and constitutes a touch panel 15 together with the operation panel 14. The operation panel 14 and the operation button 16 function as an instruction reception unit that receives an instruction from the user, and the user can operate the terminal device 11 and the camera device 20 connected to the terminal device 11 via the operation panel 14 (the touch panel 15) and the operation button 16. The speaker 17 and the microphone 18 function as a calling unit, and the user can talk with a user of another phone through the speaker 17 and microphone 18. The terminal camera 19 may perform imaging according to an instruction from the user via the operation button 16 or the operation panel 14 (the touch panel 15).

The user can control an operation of the camera device 20 using the terminal device 11 described above. For example, the captured image can be transmitted from the camera device 20 to the terminal device 11 and displayed on the display 13, and an imaging direction of the camera device 20 (a direction of an optical axis L of the imaging optical system 21) can be changed. In particular, the tracking system 10 of this example can execute tracking imaging for continuously performing imaging while tracking a specific target, and the user can control the tracking imaging using the terminal device 11. Hereinafter, tracking imaging will be described.

FIG. 2 is a block diagram illustrating an example of a function related to tracking imaging in a functional configuration of the tracking system 10.

The camera device 20 includes an imaging unit 30, an imaging direction adjustment unit 32, a camera-side communication unit 36, and a camera-side controller 34 that generally controls the imaging unit 30, the imaging direction adjustment unit 32, and the camera-side communication unit 36.

The imaging unit 30 includes the imaging optical system 21 (see FIG. 1) and an imaging element (not illustrated), and acquires captured image data. In particular, since the camera device 20 of this example is a tracking camera that continuously performs imaging of a subject, the imaging unit 30 can regularly perform imaging under the control of the camera-side controller 34 and outputs acquired captured image data.

The imaging direction adjustment unit 32 of this example is configured as a pan and tilt mechanism including a pan driving unit and a tilt driving unit (not illustrated), in addition to the pedestal 23, the holding unit 25, and the gear 26 illustrated in FIG. 1, and can adjust an imaging direction of the imaging unit 30 (that is, a direction of the optical axis L of the imaging optical system 21).

The camera-side controller 34 controls the imaging direction adjustment unit 32 on the basis of the target information indicating the position of the tracking target. In particular, the camera-side controller 34 of this example controls the imaging direction adjustment unit 32 to adjust the imaging direction so that the tracking target is arranged at a specific position or within a specific range in the captured image. The "specific position" or the "specific range" described herein is not particularly limited, but it is preferable for the specific position or the specific range to be set to a position or a range corresponding to a central portion of the captured image (that is, a position or a range corresponding to the optical axis L) from the viewpoint of ensuring good visibility of the tracking target. The target information is calculated through a tracking calculation process to be described below and is provided to the camera-side controller 34.

Therefore, for example, in a case where the tracking target moves in a horizontal direction, the imaging direction adjustment unit 32 pan-drives the imaging unit 30 under the control of the camera-side controller 34 so that the imaging direction moves in the horizontal direction according to the movement of the tracking target. Similarly, in a case where the tracking target moves in a vertical direction, the imaging direction adjustment unit 32 tilt-drives the imaging unit 30 under the control of the camera-side controller 34 so that the imaging direction moves in the vertical direction according to the movement of the tracking target. By continuously performing imaging of the tracking target while adjusting the imaging direction in this way, tracking imaging is performed.

The camera-side communication unit 36 is connected to the camera-side controller 34, performs communication with the terminal device 11 (particularly, a terminal-side communication unit 44 to be described below) (see an arrow "C" in FIG. 2), performs transmission of data that is sent from the camera device 20 to the terminal device 11, and performs reception of data that is sent from the terminal device 11 to the camera device 20. That is, the camera-side communication unit 36 transmits data sent from the camera-side controller 34 to the terminal device 11 (the terminal-side communication unit 44), and receives data sent from the terminal device 11 (the terminal-side communication unit 44) and sends the data to the camera-side controller 34.

The data transmitted and received between the camera device 20 (the camera-side communication unit 36) and the terminal device 11 (the terminal-side communication unit 44) is not particularly limited. For example, basic tracking information including information on at least one of captured image data acquired by the imaging unit 30, tracking image data generated through a tracking image generation process to be described below, the above-described target information, a size of the tracking target or a speed of the tracking target, and various commands can be transmitted and received between the camera device 20 and the terminal device 11, if necessary.

Meanwhile, the terminal device 11 which can be connected to the camera device 20 includes a user interface 42, the terminal-side communication unit 44, and a terminal-side controller 40 that generally controls the user interface 42 and the terminal-side communication unit 44.

The terminal-side communication unit 44 can communicate with the camera-side communication unit 36, receives data sent from the camera-side communication unit 36, sends the data to the terminal-side controller 40, and transmits data sent from the terminal-side controller 40 to the camera-side communication unit 36. A scheme of communication between the terminal-side communication unit 44 and the camera-side communication unit 36 is not particularly limited, and may be a wired connection scheme or may be a wireless connection scheme. Further, the communication scheme may be a communication scheme based on a wireless local area network (LAN) conforming to the IEEE 802.11a/b/g/n standard defined by The Institute of Electrical and Electronics Engineers, Inc. (IEEE), or the like, or may be a communication scheme based on Near Field Wireless confirming to a Bluetooth (registered trademark) standard or the like. Further, the terminal-side communication unit 44 may perform transmission and reception of data to and from a base station (not illustrated) on the basis of a 3rd generation mobile communication system conforming to the IMT-2000 standard or a 4th generation mobile communication system conforming to the IMT-Advance standard.

The terminal-side controller 40 is connected to the terminal-side communication unit 44 and the user interface 42, performs various controls on the basis of data such as commands sent from the user interface 42, and controls the terminal-side communication unit 44 to send the data to the camera-side communication unit 36, as necessary.

The user interface 42 constitutes an interface to the user of the terminal device 11. Thus, for example, the operation button 16 and the touch panel 15 (the operation panel 14) that receive an instruction from the user, the display 13 that can display an image or the like, the speaker 17 that provides sound to the user, and the microphone 18 that acquires sound may be included in the user interface 42.

In the tracking system 10 having the functional configuration described above, at least one of the camera-side controller 34 or the terminal-side controller 40 performs the tracking image generation process of generating the tracking image data from the captured image data. Further, at least one of the camera-side controller 34 or the terminal-side controller 40 performs the tracking calculation process of acquiring target information on the basis of the tracking image data.

Figure 3:
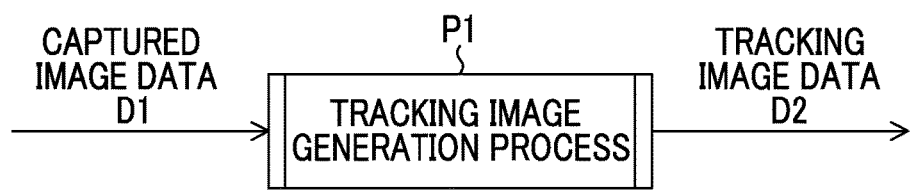
FIG. 3 is a conceptual diagram of a tracking image generation process.
Figure 4:
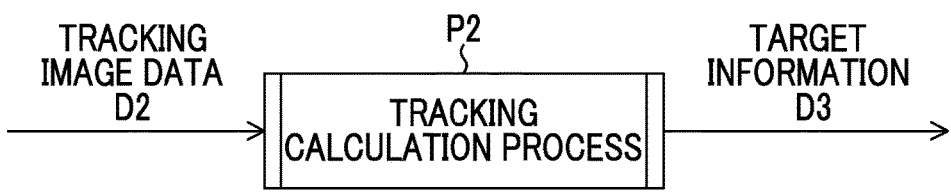
FIG. 4 is a conceptual diagram of a tracking calculation process.

FIG. 3 is a conceptual diagram of a tracking image generation process P1. FIG. 4 is a conceptual diagram of a tracking calculation process P2. In the tracking image generation process P1, tracking image data D2 is generated from the captured image data D1, and in the tracking calculation process P2, target information D3 is acquired from the tracking image data D2. A specific algorithm for the tracking image generation process P1 and the tracking calculation process P2 is not particularly limited, and can generate the tracking image data D2 and acquire the target information D3 according to an arbitrary scheme. For example, in the tracking image generation process P1, the tracking image data D2 suitable for acquisition of the target information D3 can be generated by changing resolution of a part of the captured image data D1.

Figure 5A:
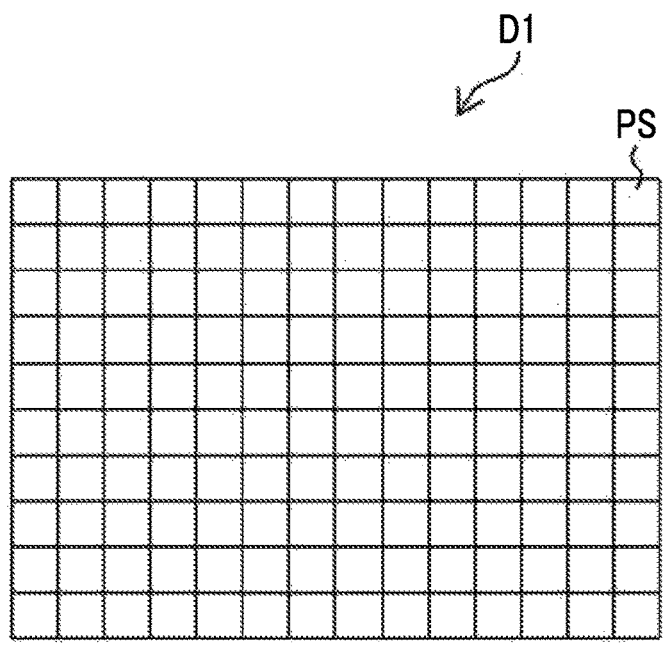
FIG. 5A is a conceptual diagram illustrating an example of captured image data.
Figure 5B:
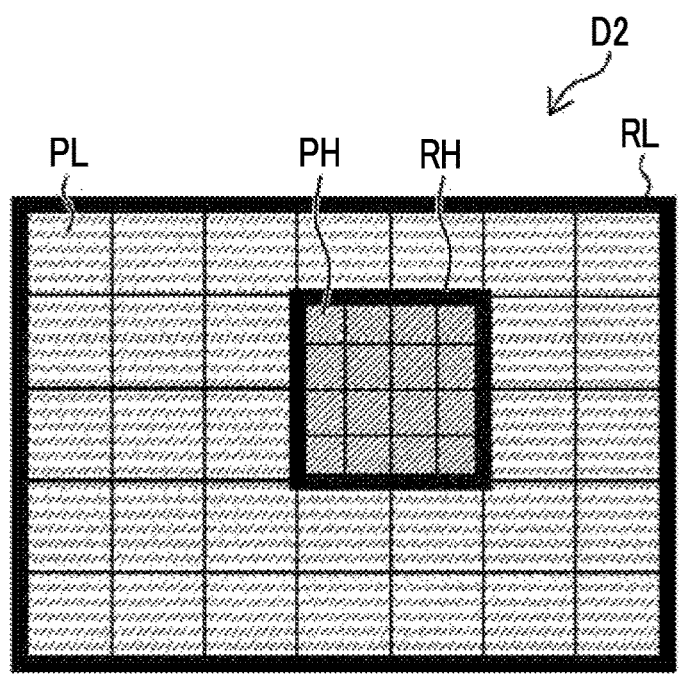
FIG. 5B is a conceptual diagram illustrating an example of tracking image data.

FIG. 5 is a conceptual diagram illustrating an example of the captured image data D1 and the tracking image data D2, a portion (a) of FIG. 5 illustrates the captured image data D1, and a portion (b) of FIG. 5 illustrates the tracking image data D2. The captured image data D1 of this example is data of an image having uniform resolution over the entire image, whereas the tracking image data D2 is data of an image including the high-resolution region RH of which the resolution is relatively high and the high-resolution region RL of which the resolution is relatively low. That is, the captured image data D1 is constituted by a set of first pixels PS having a certain size, whereas the tracking image data D2 includes the high-resolution region RH constituted by a set of second pixels PH having a relatively small pixel size, and the low-resolution region RL constituted by a set of third pixels PL having a relatively large pixel size.

A specific scheme of setting the high-resolution region RH and the low-resolution region RL is not particularly limited. For example, the second pixel PH of the high-resolution region RH may be constituted by the same pixel as the first pixel PS of the captured image data D1, and the third pixel PL of the low-resolution region RL may be constituted by "some pixels selected from among the first pixels PS of the captured image data D1" or "representative pixels derived from a plurality of adjacent pixels". In this example, a region in which the number of pixels included in a unit area of the image is relatively large is referred to as the high-resolution region RH, and a region in which the number of pixels included in the unit area of the image is relatively small is referred to as the low-resolution region RL.

A position and a range of the high-resolution region RH and the low-resolution region RL in the tracking image data D2 are not particularly limited, but in this example, the position and the range may be determined on the basis of the basic tracking information in the tracking image generation process P1.

Figure 6:
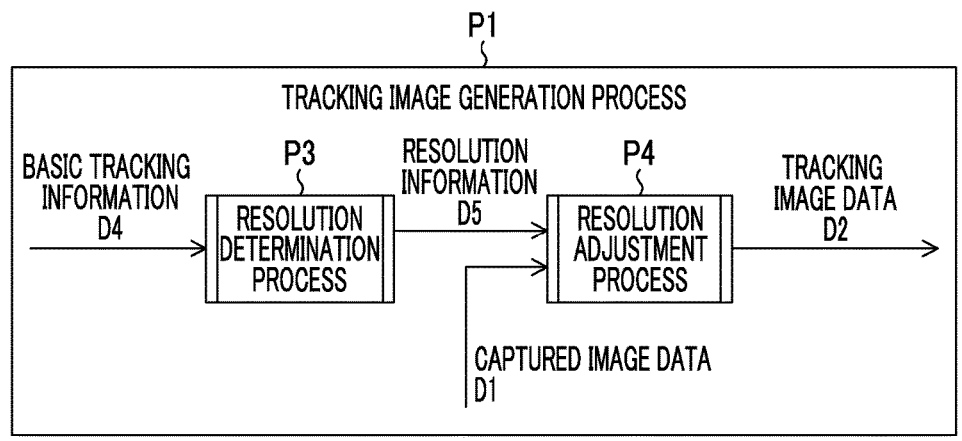
FIG. 6 is a conceptual diagram illustrating an example of a tracking image generation process.

FIG. 6 is a conceptual diagram illustrating an example of the tracking image generation process P1. The tracking image generation process P1 of this example includes a resolution determination process P3 and a resolution adjustment process P4. In the resolution determination process P3, resolution information D5 for determining the high-resolution region RH and the low-resolution region RL in the tracking image data D2 is obtained on the basis of basic tracking information D4 including the information on at least one of the size or the speed of the tracking target. In the resolution adjustment process P4, the tracking image data D2 is generated on the basis of the resolution information D5 and the captured image data D1. Thus, in the tracking image generation process P1 of this example, the basic tracking information D4 including the information on at least one of the size or the speed of the tracking target is acquired, the high-resolution region RH and the low-resolution region RL are determined on the basis of the basic tracking information D4, and the tracking image data D2 is generated.

A scheme of acquiring the basic tracking information D4 and the captured image data D1 in the tracking image generation process P1 is not particularly limited. For example, the basic tracking information D4 and the captured image data D1 held in a memory (not illustrated) may be appropriately read, and the basic tracking information D4 and the captured image data D1 output from each unit of the terminal device 11 and/or the camera device 20 may be appropriately acquired. For example, in the camera-side controller 34 and/or the terminal-side controller 40, the size and the speed of the tracking target may be acquired on the basis of the captured image data D1, and information on the acquired size and the acquired speed of the tracking target may be used as the basic tracking information D4.

Further, the basic tracking information D4 may include information other than the size and the speed of the tracking target and, for example, information indicating processing ability of the camera device 20 (the camera-side controller 34 and the camera-side communication unit 36) and the terminal device 11 (the terminal-side communication unit 44 and the terminal-side controller 40) that are actually used may be included in the basic tracking information D4.

Further, a scheme of designating the tracking target is not particularly limited. For example, when a live view image is generated from the captured image data D1 by the camera device 20 (the camera-side controller 34) or the terminal device 11 (the terminal-side controller 40), and the live view image is displayed in the display 13 (the user interface 42) of terminal device 11, the user can designate the position of the tracking target through the touch panel 15. In this case, position designation information of the tracking target may be sent from the touch panel 15 (the user interface 42) to the terminal-side controller 40 and/or the camera-side controller 34, and the terminal-side controller 40 and/or the camera-side controller 34 may specify a specific tracking target on the basis of the position designation information of the tracking target. Further, the camera-side controller 34 and/or the terminal-side controller 40 may automatically specify a specific subject such as a face on the basis of the captured image data D1 and set the specified specific subject as the tracking target. Further, by performing a moving object detection process of specifying a subject with motion using the camera-side controller 34 and/or the terminal-side controller 40, for example, a subject newly intruded into the imaging range of the imaging unit 30 may be set as the tracking target.

Figure 7:
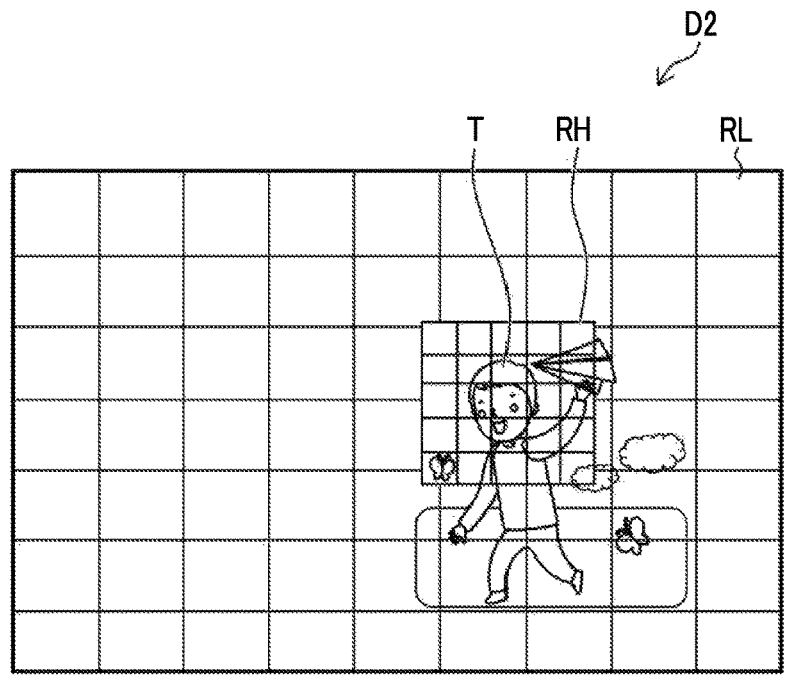
FIG. 7 is a diagram illustrating an image example of tracking image data of which resolution is adjusted on the basis of basic tracking information.

FIG. 7 is a diagram illustrating an image example of the tracking image data D2 of which the resolution has been adjusted on the basis of the basic tracking information D4. In this example, a face image of a person is set as the tracking target T, the basic tracking information D4 includes position and speed information of the tracking target T, a range near the tracking target T in the tracking image data D2 is set to the high-resolution region RH, and the other range is set to the low-resolution region RL. The high-resolution region RH and the low-resolution region RL of the tracking image data D2 are set in this way, making it possible to set a range in which an existence probability of the tracking target T is estimated to be relatively high and enhanced tracking accuracy is required, to the high-resolution region RH. Further, it is possible to set a range in which an existence probability of the tracking target T is estimated to be relatively low to the low-resolution region RL, and it is possible to effectively reduce a processing load and a processing time.

A range of the high-resolution region RH determined on the basis of the basic tracking information D4 is not particularly limited. For example, the range may be set according to only the position of the tracking target T, may be set variably according to the speed of the tracking target T, or may be variably set according to elements other than the position and the speed of the tracking target T. For example, in a case where the tracking target T is present in a central portion of the tracking image data D2 (and, the captured image data D1) and a case where the tracking target T is present in an end portion of the tracking image data D2, the range of the high-resolution region RH may be different. Further, in a case where the speed of the tracking target T is relatively high, the range of the high-resolution region RH may be wider than in a case where the speed of the tracking target T is relatively slow. Further, the range of the high-resolution region RH may be determined variably according to, for example, an acceleration of the tracking target T, the movement direction of the tracking target T, and/or another feature of the tracking target T, in addition to the position and/or the speed of the tracking target T. Further, in a case where the basic tracking information D4 includes information on the processing capability of the camera device 20 and the terminal device 11, the ranges of the high-resolution region RH and the low-resolution region RL may be determined, for example, according to the processing capability of the camera device 20 and the terminal device 11.

Further, a shape of the high-resolution region RH is not limited to a square shape and, for example, the high-resolution region RH in another polygonal shape or a circular shape may be set. Further, the shape of the high-resolution region RH may be set according to the position, the speed, and/or another element of the tracking target T.

Next, a specific embodiment of the tracking image generation process P1 and the tracking calculation process P2 will be described. The tracking system 10 of this example performs the tracking image generation process P1 and the tracking calculation process P2 described above in parallel.

Figure 8:
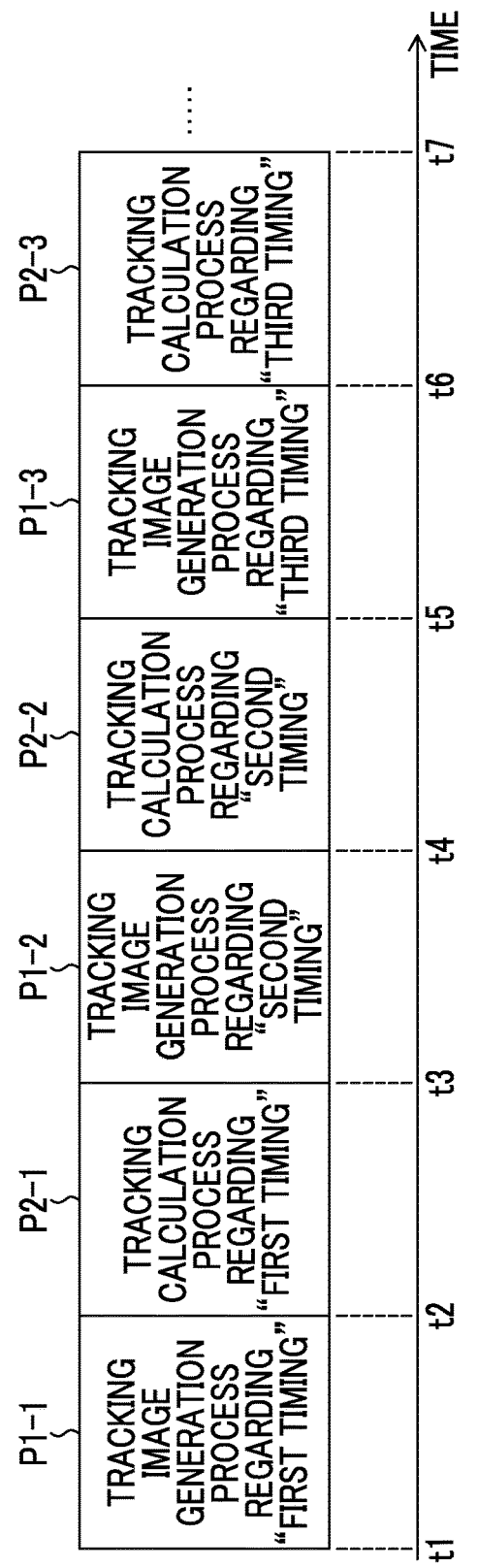
FIG. 8 is a diagram illustrating an example in which the tracking image generation process and the tracking calculation process are performed in series.

FIG. 8 is a diagram illustrating an example in which the tracking image generation process P1 and the tracking calculation process P2 are performed in series. In FIG. 8, reference signs "P1-1", "P1-2", and "P1-3" indicate the tracking image generation processes P1 regarding the first timing, the second timing, and the third timing, respectively, and reference signs "P2-1", "P2-2", and "P2-3" indicate the tracking calculation processes P2 regarding the first timing, the second timing, and the third timing, respectively. The second timing refers to a timing after the first timing, and the third timing refers to a timing after the second timing.

In the tracking image generation process P1-1 regarding the first timing, the tracking image data D2 is generated from the captured image data D1 acquired at the first timing. In the tracking image generation process P1-2 regarding the second timing, the tracking image data D2 is generated from the captured image data D1 acquired at the second timing. In the tracking image generation process P1-3 regarding the third timing, the tracking image data D2 is generated from the captured image data D1 acquired at the third timing. Further, in the tracking calculation process P2-1 regarding the first timing, the target information D3 indicating the position of the tracking target at the first timing is acquired on the basis of the tracking image data D2 generated through the tracking image generation process P1-1 regarding the first timing. In the tracking calculation process P2-2 regarding the second timing, the target information D3 indicating the position of the tracking target at the second timing is acquired on the basis of the tracking image data D2 generated through the tracking image generation process P1-2 regarding the second timing. In the tracking calculation process P2-3 regarding the third timing, the target information D3 indicating the position of the tracking target at the third timing is acquired on the basis of the tracking image data D2 generated through the tracking image generation process P1-3 regarding the third timing.

In a case where the tracking image generation process P1 and the tracking calculation process P2 are performed in series in this way, time equal to or longer than a sum of a processing time of the tracking image generation process P1 and a processing time of the tracking calculation process P2 is required as a total processing time. That is, in the example illustrated in FIG. 8, a sum (t1 to t7) of time (t1 to t2) required for the tracking image generation process P1-1 regarding the first timing, time (t2 to t3) required for the tracking calculation process P2-1 regarding the first timing, time (t3 to t4) required for the tracking image generation process P1-2 regarding the second timing, time (t4 to t5) required for the tracking calculation process P2-2 regarding the second timing, time (t5 to t6) required for the tracking image generation process P1-3 regarding the third second timing, and time (t6 to t7) required for the tracking calculation process P2-3 regarding the third timing is necessary to acquire the target information D3 at the first to third timings.

On the other hand, in the tracking system 10 of this example, the tracking image generation process P1 and the tracking calculation process P2 are performed in parallel, making it possible to greatly reduce the total processing time.

Figure 9:
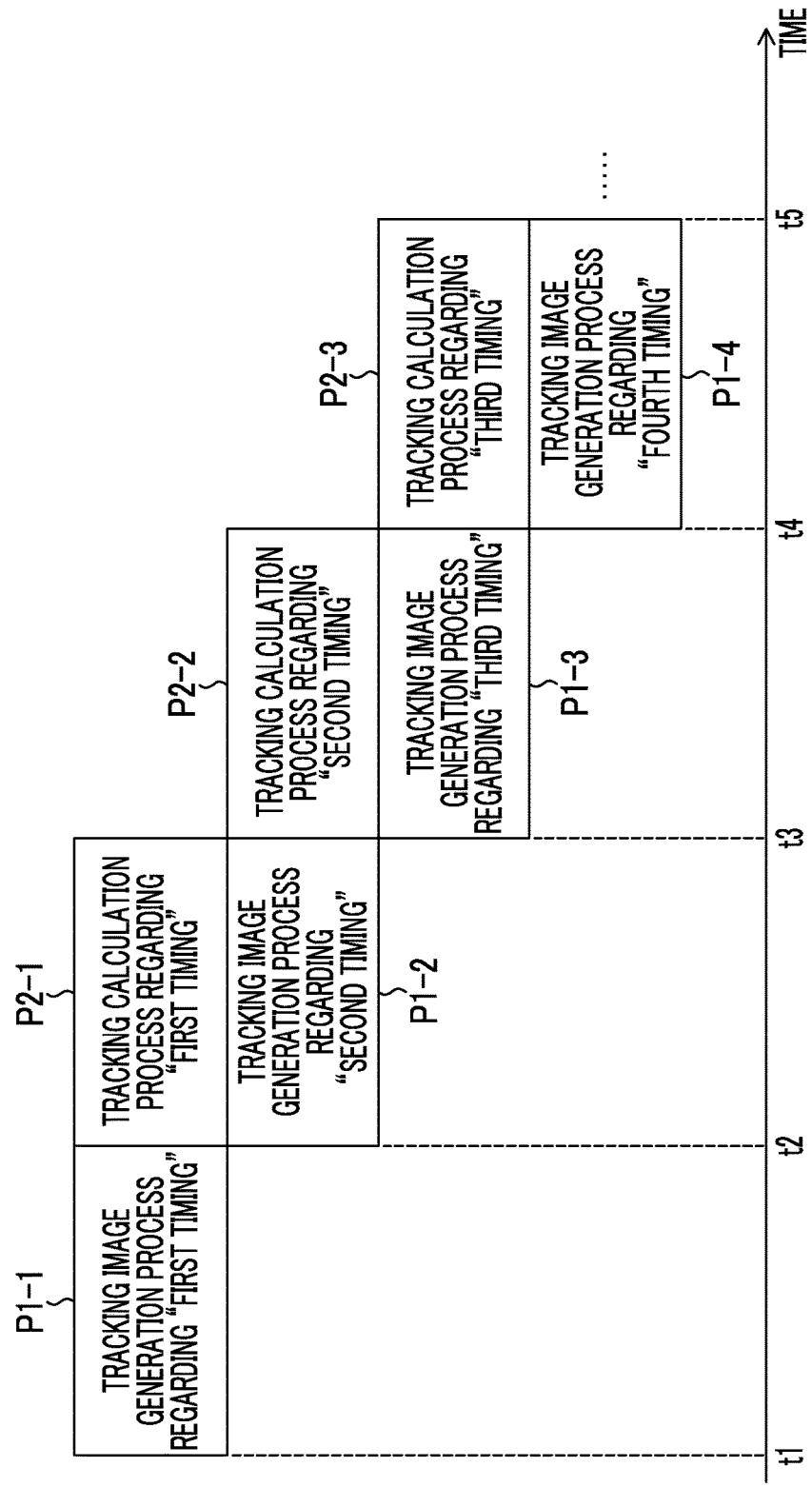
FIG. 9 is a diagram illustrating an example in which the tracking image generation process and the tracking calculation process are performed in parallel.

FIG. 9 is a diagram illustrating an example in which the tracking image generation process P1 and the tracking calculation process P2 are performed in parallel. In the example illustrated in FIG. 9, the tracking calculation process P2-1 regarding the first timing and the tracking image generation process P1-2 regarding the second timing are performed in parallel, the tracking calculation process P2-2 regarding the second timing and the tracking image generation process P1-3 regarding the third timing are performed in parallel, and the tracking calculation process P2-3 regarding the third timing and the tracking image generation process P1-4 regarding the fourth timing are performed in parallel.

In an example illustrated in FIG. 9, a time of period "t1 to t2" is represented as a period of time required for the tracking image generation process P1-1 regarding the first timing, a time of period "t2 to t3" is represented as a period of time required for the tracking calculation process P2-1 regarding the first timing and the tracking image generation process P1-2 regarding the second timing, a time of period "t3 to t4" is represented as a period of time required for the tracking calculation process P2-2 regarding the second timing and the tracking image generation process P1-3 regarding the third timing, and a time of period "t4 to t5" is represented as a period of time required for the tracking calculation process P2-3 regarding the third timing and the tracking image generation process P1-4 regarding the fourth timing.

Particularly, in the tracking system 10 of this example, the imaging direction is adjusted so that the tracking target is arranged at a specific position or in a specific range in the captured image. Therefore, the high-resolution region RH and the low-resolution region RL of the tracking image data D2 generated through the tracking image generation process P1 can be determined with reference to the specific position or the specific range, and the tracking image generation process P1 and the tracking calculation process P2 can be performed in parallel as illustrated in FIG. 9.

For example, in a case where the tracking target is not placed at a specific position or in a specific range in the image, a position in the image to which the tracking target moves cannot be known. Accordingly, the high-resolution region RH cannot be specified until the tracking calculation process P2 has completely ended, and it is necessary for the tracking image generation process P1 and the tracking calculation process P2 to be performed in series. Meanwhile, when the imaging direction is adjusted by the imaging direction adjustment unit 32 such as a pan and tilt mechanism as in this example and the tracking target is placed at a specific position or in specific range of the captured image, the position of the tracking target is basically maintained at the specific position or in the specific range through tracking imaging. Accordingly, in a case where the tracking target is placed at the specific position or in the specific range in the captured image, the tracking image data D2 can be generated from the captured image data D1 on the basis of the specific position or the specific range in the captured image in which the tracking target is expected to be placed even when an exact position of the tracking target at each timing is not specified. In the case where the imaging direction is controlled so that the tracking target is placed at the specific position or in the specific range in the captured image at the time of tracking-imaging in this way, the tracking image generation process P1 regarding the next timing (frame) can be performed without waiting for completion of the tracking calculation process P2 regarding an immediately previous timing (frame). Accordingly, the tracking image generation process P1 and the tracking calculation process P2 can be performed in parallel.

At least a portion of the tracking calculation process P2-1 of acquiring the target information D3 indicating the position of the tracking target at the first timing on the basis of the tracking image data D2 generated from the captured image data D1 acquired at the first timing is performed simultaneously with at least a portion of the tracking image generation process P1-2 of generating the tracking image data D2 that is used to acquire the target information D3 indicating the position of the tracking target at the second timing after the first timing, from the captured image data D1 acquired at the second timing. Thus, a parallel process may be performed, and the present invention is not limited to the example illustrated in FIG. 9.

That is, "at least a portion of the tracking image generation process P1" and "at least a portion of the tracking calculation process P2" regarding a different timing from that of the tracking image generation process P1 may temporally overlap in time. Thus, for example, while the whole of one of the tracking image generation process P1 and the tracking calculation process P2 of which the timings are different is being performed, the whole of the other may be performed.

By performing the tracking image generation process P1 and the tracking calculation process P2 in parallel in this way, it is possible to greatly reduce time required for the entire tracking process, as compared with a case where the tracking image generation process P1 and the tracking calculation process P2 are performed in series (see FIG. 8).

The tracking image generation process P1 and the tracking calculation process P2 may be performed in any one of the camera-side controller 34 and the terminal-side controller 40, or may be performed in both.

Hereinafter, a representative embodiment of the tracking system 10 will be described.

First Embodiment

In this embodiment, both the tracking image generation process P1 and the tracking calculation process P2 are performed in the terminal device 11 (the terminal-side controller 40). That is, the terminal-side controller 40 performs the tracking image generation process P1 of generating the tracking image data D2 from the captured image data D1. Further, the terminal-side controller 40 performs the tracking calculation process P2 of acquiring the target information D3 on the basis of the tracking image data D2, and transmits the target information D3 to the camera-side controller 34 via the terminal-side communication unit 44 and the camera-side communication unit 36.

Figure 10:
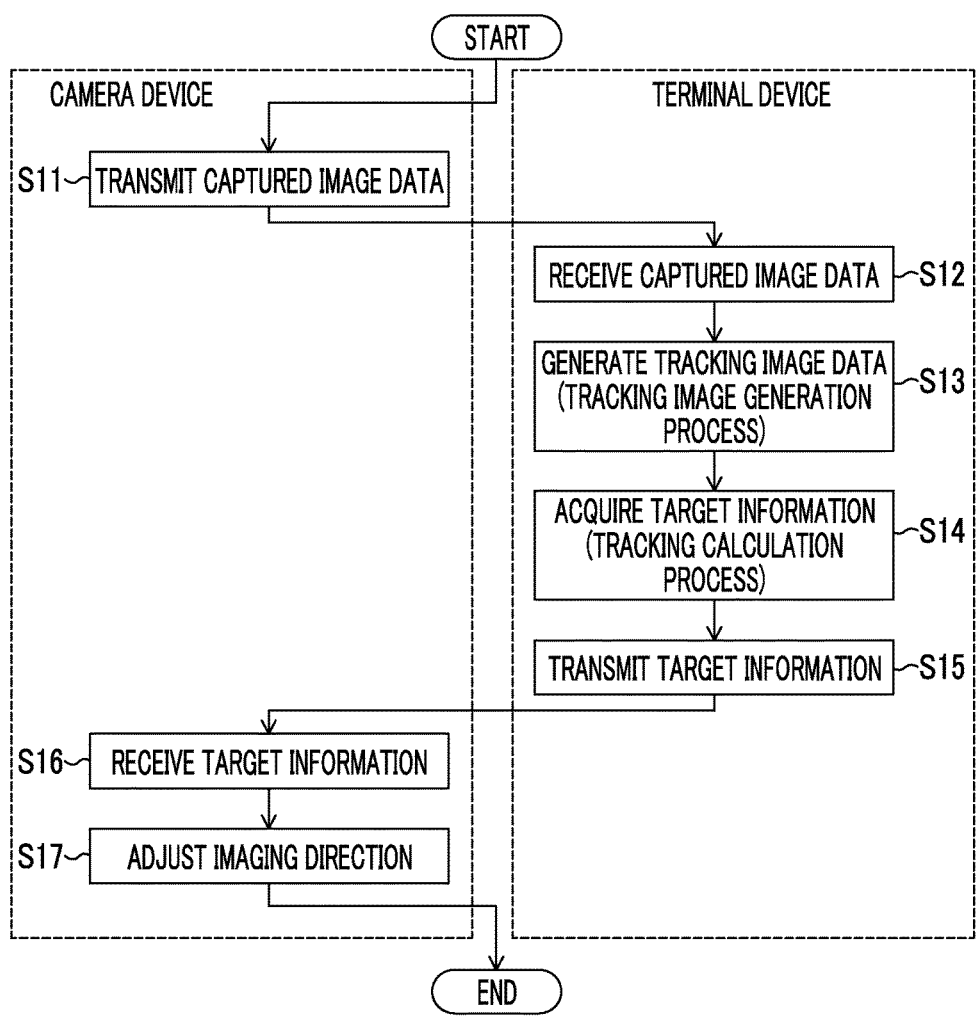
FIG. 10 is a diagram illustrating an example of a tracking process flow according to a first embodiment.

FIG. 10 is a diagram illustrating an example of a tracking process flow according to the first embodiment.

The captured image data D1 acquired by the imaging unit 30 of the camera device 20 at the time of tracking-imaging is transmitted from the camera-side communication unit 36 under the control of the camera-side controller 34 (S11 in FIG. 10), is received by the terminal-side communication unit 44 of the terminal device 11 (S12), and is acquired by the terminal-side controller 40.

The tracking image generation process P1 of generating the tracking image data D2 from the captured image data D1 is performed by the terminal-side controller 40 (S13), and then, the tracking calculation process P2 of acquiring the target information D3 on the basis of the tracking image data D2 is performed (S14).

The target information D3 acquired by the terminal-side controller 40 is transmitted from the terminal-side communication unit 44 (S15), is received by the camera-side communication unit 36 (S16), and is acquired by the camera-side controller 34.

The camera-side controller 34 controls the imaging direction adjustment unit 32 on the basis of the target information D3 that is acquired in this way to adjust an imaging direction of the imaging unit 30 (a direction of the optical axis L of the imaging optical system 21) (S17), making it possible to perform imaging while tracking the tracking target. In this embodiment, the imaging direction is adjusted so that the tracking target is arranged at a specific position or in a specific range in the captured image.

The above-described processes (S11 to S17) illustrated in FIG. 10 are performed for the respective imaging timings (see the "first timing" to "fourth timing" described above), steps S11, S16, and S17 described above are performed by the camera device 20, and steps S12 to S15 are performed by the terminal device 11. The tracking image generation process P1 (S13) and the tracking calculation process P2 (S14) are performed in parallel, and for example, at least a portion of the tracking calculation process P2-1 (S14) regarding the first timing and at least a portion of the tracking image generation process P1-2 (S13) regarding the second timing are simultaneously performed (see FIG. 9).

Accordingly, it is possible to greatly shorten a processing time of the entire tracking process and supped up the tracking process and, as a result, it is possible to appropriately track a fast moving tracking target and ensure good tracking accuracy.

Second Embodiment

One of the tracking image generation process P1 and the tracking calculation process P2 described above may be performed in one of the camera-side controller 34 and the terminal-side controller 40, and the other of the tracking image generation process P1 and the tracking calculation process P2 may be performed in the other of the camera-side controller 34 and the terminal-side controller 40.

In this embodiment, a case where the tracking image generation process P1 is performed in the camera-side controller 34, and the tracking calculation process P2 is performed in the terminal-side controller 40 will be described by way of example. In this embodiment, detailed description of a configuration that is the same as or similar to that in the first embodiment described above will be omitted.

Figure 11:
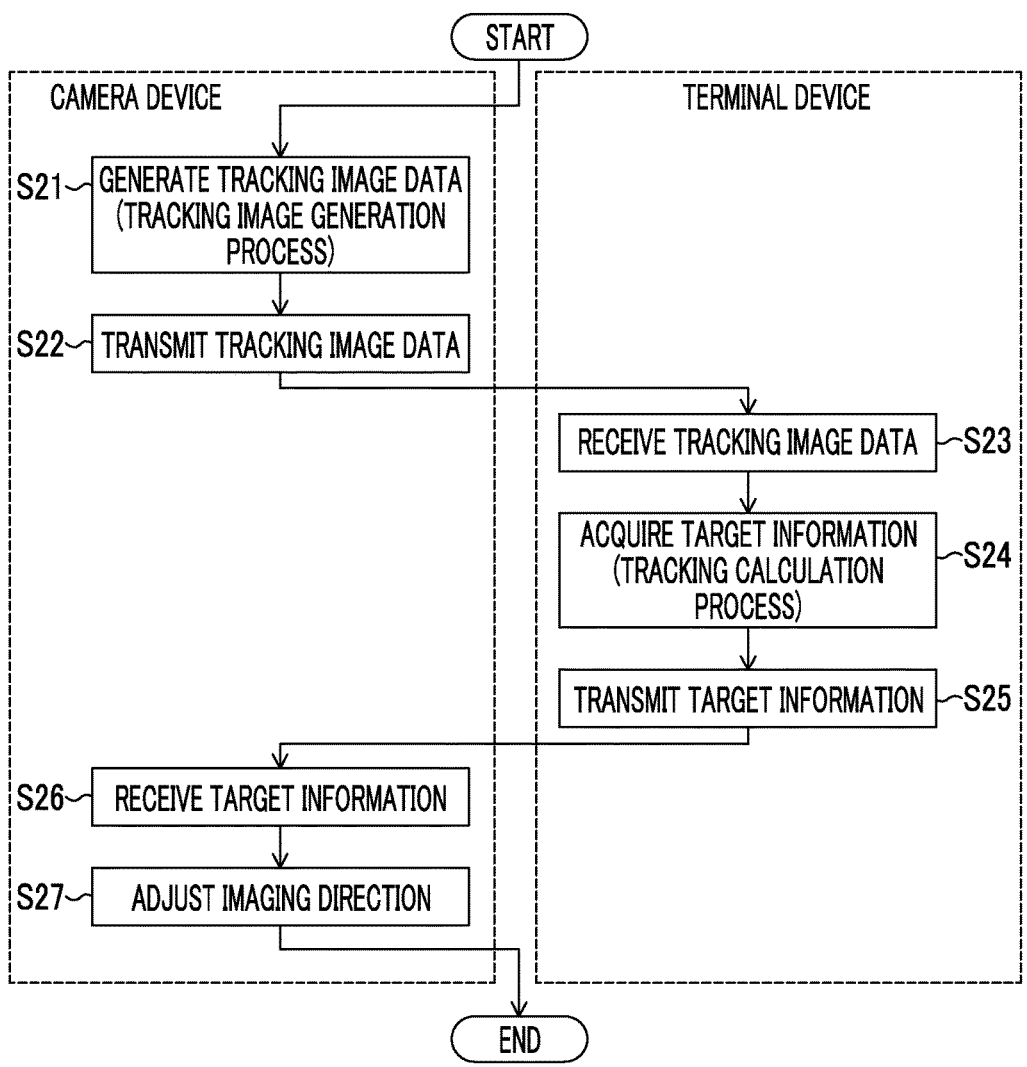
FIG. 11 is a diagram illustrating an example of a tracking process flow according to a second embodiment.

FIG. 11 is a diagram illustrating an example of a tracking process flow according to the second embodiment.

At the time of tracking-imaging, the camera-side controller 34 of the camera device 20 performs the tracking image generation process P1 of generating the tracking image data D2 from the captured image data D1 acquired by the imaging unit 30 (S21 in FIG. 11). The tracking image data D2 generated through the tracking image generation process P1 is transmitted from the camera-side communication unit 36 under the control of the camera-side controller 34 (S22), received by the terminal-side communication unit 44 of the terminal device 11 (S23), and is acquired by the terminal-side controller 40. Other data such as the captured image data D1 together with the tracking image data D2 may be sent from the camera-side communication unit 36 to the terminal-side communication unit 44.

The tracking calculation process P2 of acquiring the target information D3 is performed on the basis of the tracking image data D2 by the terminal-side controller 40 (S24). The acquired target information D3 is transmitted from the terminal-side communication unit 44 (S25), is received by the camera-side communication unit 36 (S26), and is acquired by the camera-side controller 34.

The camera-side controller 34 controls the imaging direction adjustment unit 32 on the basis of the target information D3 that is acquired in this way, and adjusts the imaging direction of the imaging unit 30 so that the tracking target is arranged at a specific position or in a specific range in the captured image (S27).

The above-described processes (S21 to S27) illustrated in FIG. 11 are performed for the respective imaging timings (see the "first timing" to "fourth timing" described above), similar to the first embodiment described above. The tracking image generation process P1 (S21) in the camera-side controller 34 and the tracking calculation process P2 (S24) in the terminal-side controller 40 are performed in parallel, and for example, at least a portion of the tracking calculation process P2-1 (S24) regarding the first timing and at least a portion of the tracking image generation process P1-2 (S21) regarding the second timing are simultaneously performed (see FIG. 9).

Third Embodiment

In this embodiment, an example in which the tracking image generation process P1 and the tracking calculation process P2 are performed by the camera-side controller 34 will be described. That is, the camera-side controller 34 of this embodiment performs the tracking image generation process P1 of generating the tracking image data D2 from the captured image data D1 and the tracking calculation process P2 of acquiring the target information D3 on the basis of the tracking image data D2 in parallel.

In this embodiment, detailed description of a configuration that is the same as or similar to that in the first embodiment described above will be omitted.

Figure 12:
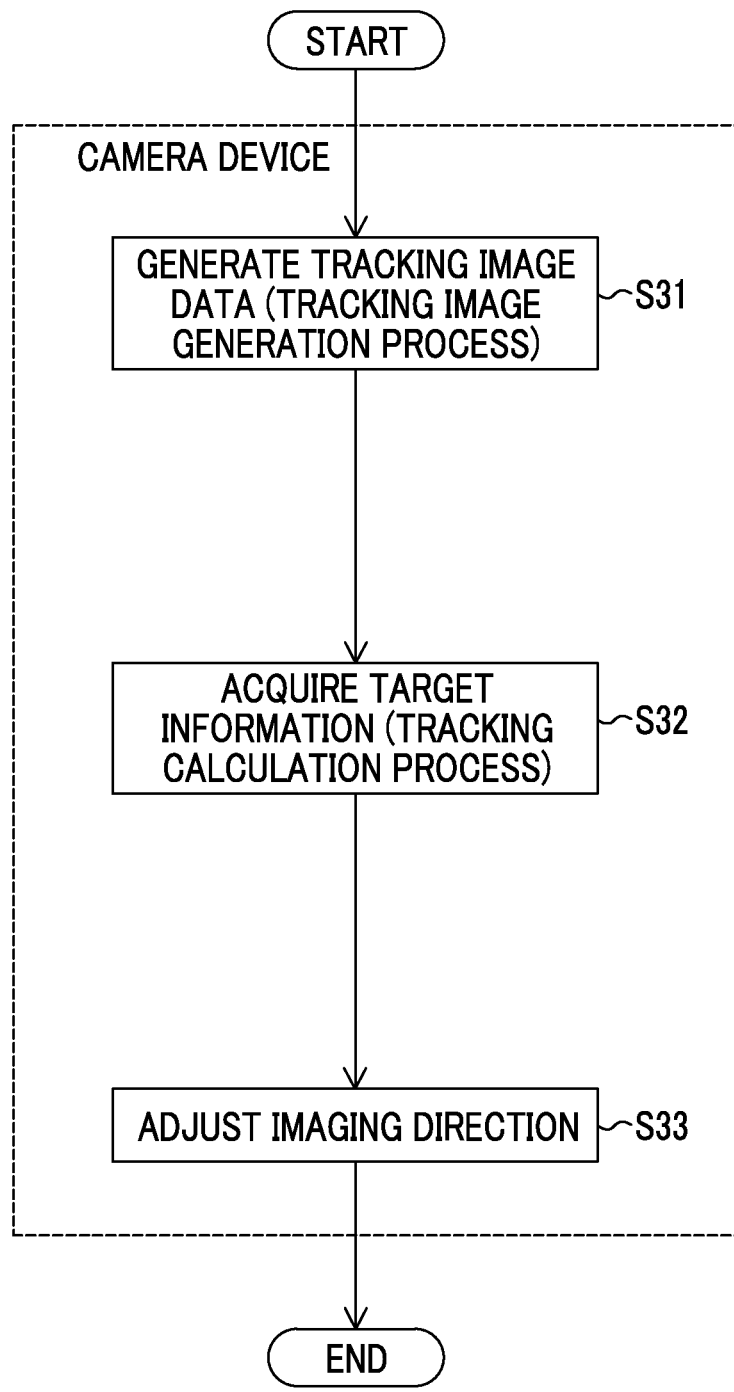
FIG. 12 is a diagram illustrating an example of a tracking process flow according to a third embodiment.

FIG. 12 is a diagram illustrating an example of a tracking process flow according to the third embodiment.

At the time of tracking-imaging, the camera-side controller 34 of the camera device 20 performs the tracking image generation process P1 of generating the tracking image data D2 from the captured image data D1 acquired by the imaging unit 30 (S31 in FIG. 12). Further, the camera-side controller 34 performs the tracking calculation process P2 of acquiring the target information D3 on the basis of the tracking image data D2 (S32). The camera-side controller 34 controls the imaging direction adjustment unit 32 on the basis of the target information D3 that is acquired in this way, and adjusts the imaging direction of the imaging unit 30 so that the tracking target is arranged at a specific position or in a specific range in the captured image (S33).

The above-described processes (S31 to S33) illustrated in FIG. 12 are performed for the respective imaging timings (see the "first timing" to "fourth timing" described above), as in the first embodiment described above. The tracking image generation process P1 (S31) and the tracking calculation process P2 (S32) in the camera-side controller 34 are performed in parallel, and for example, at least a portion of the tracking calculation process P2-1 (S32) regarding the first timing and at least a portion of the tracking image generation process P1-2 (S31) regarding the second timing are simultaneously performed (see FIG. 9).

Fourth Embodiment

The tracking calculation process P2 may be performed by both of the camera-side controller 34 and the terminal-side controller 40. In this case, it is preferable that a controller having a relatively higher processing capability between the camera-side controller 34 and the terminal-side controller 40 performs the tracking calculation process P2 of the high-resolution region RH, and a controller having a relatively lower processing capability between the camera-side controller 34 and the terminal-side controller 40 performs the tracking calculation process P2 of the low-resolution region RL.

In this embodiment, an example of a case in which the terminal-side controller 40 has a higher processing capability than the camera-side controller 34, the terminal-side controller 40 performs the tracking calculation process P2 of the high-resolution region RH, and the camera-side controller 34 performs the tracking calculation process P2 of the low-resolution region RL will be described. In this embodiment, detailed description of a configuration that is the same as or similar to that in the first embodiment described above will be omitted.

Figure 13:
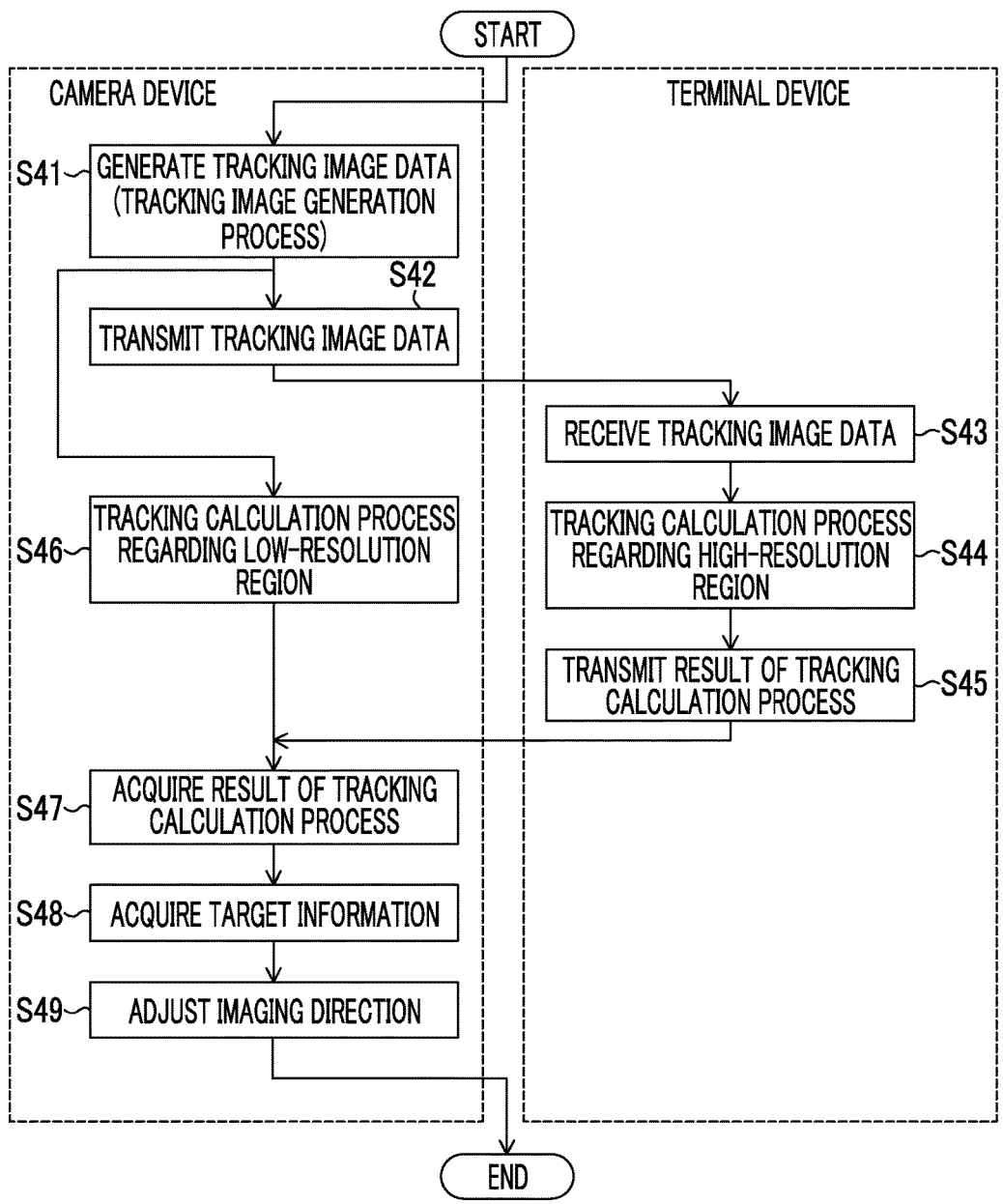
FIG. 13 is a diagram illustrating an example of a tracking process flow according to a fourth embodiment.

FIG. 13 is a diagram illustrating an example of a tracking process flow according to the fourth embodiment.

At the time of tracking-imaging, the camera-side controller 34 of the camera device 20 performs the tracking image generation process P1 of generating the tracking image data D2 from the captured image data D1 acquired by the imaging unit 30 (S41 in FIG. 13). The tracking image data D2 generated through the tracking image generation process P1 is transmitted from the camera-side communication unit 36 under the control of the camera-side controller 34 (S42), is received by the terminal-side communication unit 44 of the terminal device 11 (S43), and is acquired by the terminal-side controller 40.

The tracking calculation process P2 is performed regarding the high-resolution region RH of the tracking image data D2 by the terminal-side controller 40 (S44). A result of the tracking calculation process P2 regarding the high-resolution region RH is transmitted from the terminal-side communication unit 44 (S45), and is acquired by the camera-side controller 34 through the camera-side communication unit 36 (S47).

Meanwhile, in the camera-side controller 34, the tracking image generation process P1 (S41) is performed, the tracking calculation process P2 is performed regarding the low-resolution region RL of the tracking image data D2 (S46), and then, a result of the tracking calculation process P2 regarding the low-resolution region RL is acquired (S47).

The camera-side controller 34 acquires the target information D3 on the basis of the "result of the tracking calculation process P2 regarding the high-resolution region RH of the tracking image data D2" and the "result of the tracking calculation process P2 regarding the low-resolution region RL of the tracking image data D2" (S48). The camera-side controller 34 controls the imaging direction adjustment unit 32 on the basis of the target information D3 that is acquired in this way, and adjusts the imaging direction of the imaging unit 30 so that the tracking target is arranged at a specific position or in a specific range in the captured image (S49).

The above-described processes (S41 to S49) illustrated in FIG. 13 are performed for the respective imaging timings (see the "first timing" to "fourth timing" described above), similar to the first embodiment described above. The "tracking image generation process P1 (S41) in the camera-side controller 34" and the "tracking calculation process P2 (S44 and S46) in the camera-side controller 34 and the terminal-side controller 40" are performed in parallel. For example, at least a portion of the tracking calculation process P2-1 (S44 and S46) regarding the first timing and at least a portion of the tracking image generation process P1-2 (S41) regarding the second timing are simultaneously performed (see FIG. 9).

Fifth Embodiment

In this embodiment, prior to tracking imaging, a pre-search process of acquiring a spatial frequency of the captured image data D1 of at least a portion of the imaging range of the camera device 20 is performed, and resolution of the tracking image data D2 is determined according to a result of the pre-search process.

Here, the term "imaging range of the camera device 20" can be determined according to a variable range of the imaging direction (a direction of the optical axis L of the imaging optical system 21). For example, in the tracking system 10 in which the pan and tilt mechanism is adapted as illustrated in FIG. 1, the "imaging range of the camera device 20" is determined according to a range in which a panning operation and a tilting operation can be performed.

In this embodiment, detailed description of a configuration that is the same as or similar to that in the first embodiment described above will be omitted.

Figure 14:
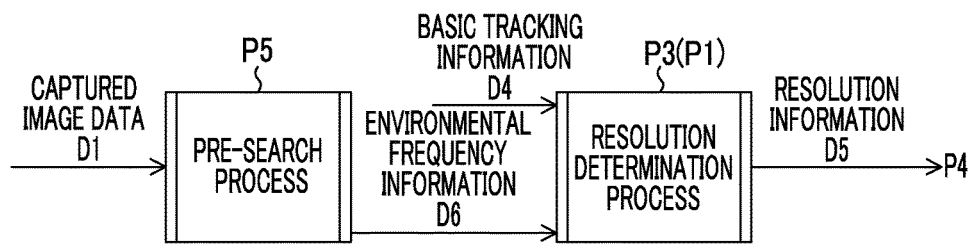
FIG. 14 is a conceptual diagram illustrating an example of a pre-search process.

FIG. 14 is a conceptual diagram illustrating an example of a pre-search process P5.

The pre-search process P5 of acquiring the spatial frequency of the captured image data D1 of at least a portion of the imaging range of the camera device 20 is performed by at least one of the camera-side controller 34 or the terminal-side controller 40. Specifically, imaging in which a target is an imaging environment which is the imaging range of the camera device 20 is performed in advance, the captured image data D1 of the imaging environment is acquired, the captured image data D1 of the imaging environment is analyzed in the pre-search process P5. Thus, environmental frequency information D6 indicating the spatial frequency of the imaging environment is acquired.

The captured image data D1 used in the pre-search process P5 and the environmental frequency information D6 acquired through the pre-search process P5 may be ones regarding a portion of the imaging range of the camera device 20 or may be ones regarding all of the imaging range. Therefore, from the point of view of a reduction in time required for the pre-search process P5, for example, only a central part of the imaging range of the camera device 20 may be a target of the captured image data D1 and the environmental frequency information D6 in the pre-search process P5.

Further, the acquisition of the captured image data D1 of the imaging environment may be automatically performed or may be manually performed. For example, the camera device 20 (the camera-side controller 34) and the terminal device 11 (the terminal-side controller 40) may automatically cooperate with each other and acquire the captured image data D1 of the imaging environment, or the captured image data D1 may be acquired for a specific range of the imaging environment that is manually designated by the user operating the terminal device 11 (see FIGS. 1 and 2).

The environmental frequency information D6 acquired through the pre-search process P5 is used in the above-described resolution determination process P3 (see FIG. 6). In the resolution determination process P3 (the tracking image generation process P1), the resolution of the tracking image data D2 is determined on the basis of the spatial frequency of the imaging environment (the environmental frequency information D6) acquired through the pre-search process P5. In the resolution determination process P3 in the example illustrated in FIG. 14, the resolution information D5 that determines the high-resolution region RH and the low-resolution region RL in the tracking image data D2 is obtained on the basis of the basic tracking information D4 and the environmental frequency information D6.

In the resolution adjustment process P4 (tracking image generation process P1), the tracking image data D2 is generated on the basis of the resolution information D5 and the captured image data D1 determined in this way. For example, in a case where the spatial frequency of the imaging environment acquired through the pre-search process P5 is relatively low, the resolution of the tracking image data D2 is set to be lower than that in a case where the spatial frequency of the imaging environment is relatively high. A scheme of setting the resolution of the tracking image data D2 is not particularly limited and, for example, in a case where the spatial frequency of the imaging environment is relatively low, resolution of one or both of the "high-resolution region RH of the tracking image data D2" and the "low-resolution region RL of the tracking image data D2" may be set to be lower than in a case where the spatial frequency of the imaging environments is relatively high.

Under an environment in which the imaging range of the camera device 20 does not change as in a case where the camera device 20 is fixedly installed, the pre-search process P5 may be performed only once before the tracking imaging. Further, the environmental frequency information D6 acquired through the pre-search process P5 may be stored in a memory (not illustrated). In the resolution determination process P3 (the tracking image generation process P1), the environmental frequency information D6 stored in the memory may be read and used to acquire the resolution information D5.

A case in which the pre-search process P5 is performed in the camera-side controller 34 (the camera device 20), and the resolution determination process P3 (the tracking image generation process P1) is performed in the terminal-side controller 40 (the terminal device 11) regarding a series of processing flows from the pre-search process P5 to the resolution determination process P3 will be described by way of example below.

Figure 15:
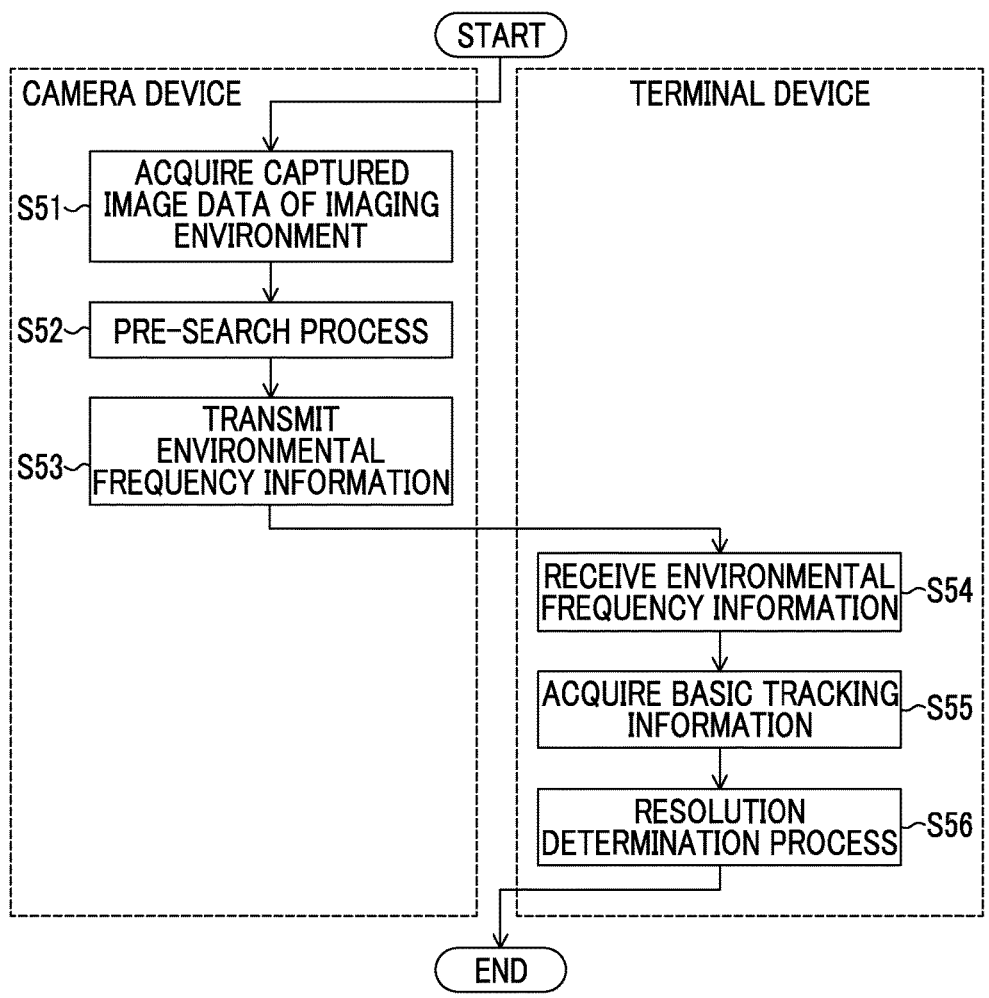
FIG. 15 is a diagram illustrating an example of a process flow from a pre-search process to a resolution determination process according to a fifth embodiment.

FIG. 15 is a diagram illustrating an example of a process flow from the pre-search process P5 to the resolution determination process P3 according to the fifth embodiment.

First, an imaging environment is imaged by the imaging unit 30 while the imaging direction is adjusted by the pan and tilt mechanism of the camera device 20, and the captured image data D1 of the imaging environment is acquired by the camera-side controller 34 (S51 in FIG. 15). In the camera-side controller 34, the pre-search process P5 is performed on the basis of the captured image data D1 of the imaging environment and the environmental frequency information D6 is acquired (S52). This environmental frequency information D6 is transmitted from the camera-side communication unit 36 (S53), is received by the terminal-side communication unit 44 of the terminal device 11 (S54), and is acquired by the terminal-side controller 40.

When the tracking imaging is started, the terminal-side controller 40 acquires the basic tracking information D4 at each imaging timing (see "the first timing" to the "fourth timing" described above) (S55), and performs the resolution determination process P3 to acquire the resolution information D5 on the basis of the basic tracking information D4 and the environmental frequency information D6 (S56). This acquired resolution information D5 is supplied to the resolution adjustment process P4 in a subsequent step.

Sixth Embodiment

In this embodiment, a case where the pre-search process P5 and the resolution determination process P3 is performed in the terminal-side controller 40 (the terminal device 11) will be described. In this embodiment, detailed description of a configuration that is the same as or similar to that in the fifth embodiment described above will be omitted.

Figure 16:
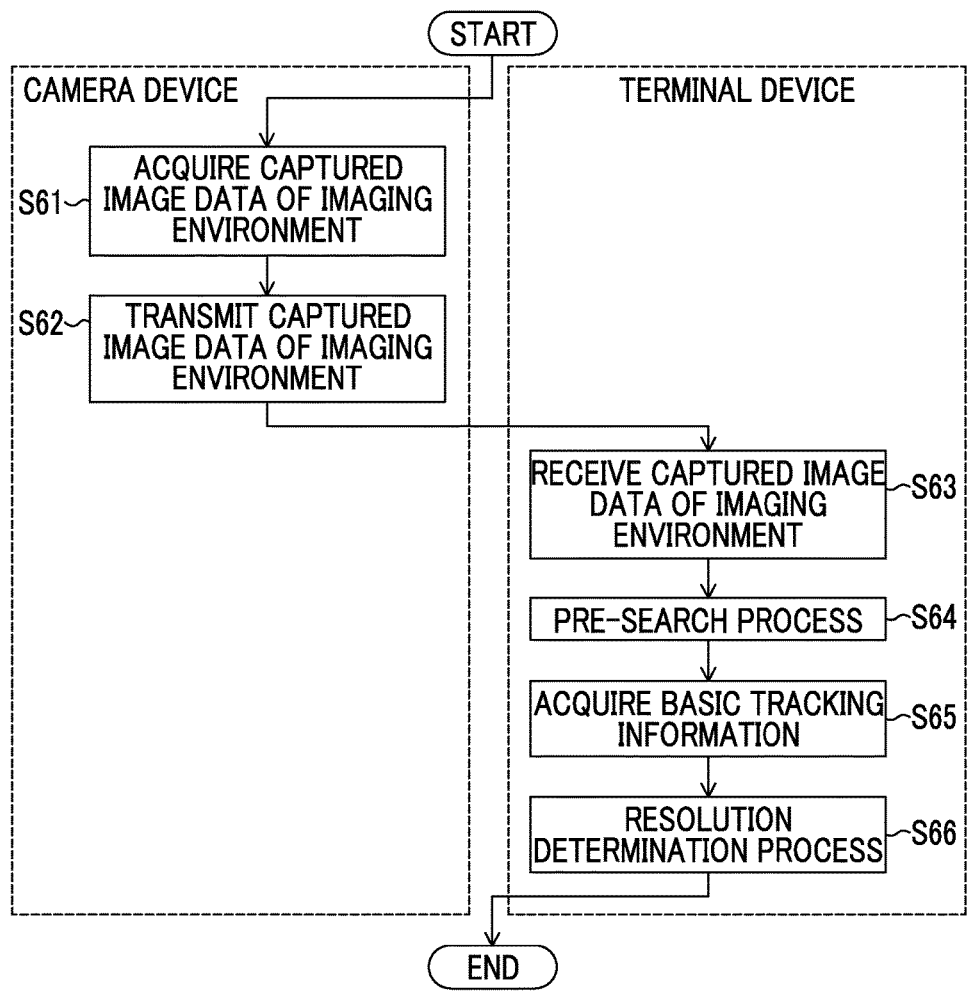
FIG. 16 is a diagram illustrating an example of a process flow from a pre-search process to a resolution determination process according to a sixth embodiment.

FIG. 16 is a diagram illustrating an example of a process flow from the pre-search process P5 to the resolution determination process P3 according to the sixth embodiment.

In this embodiment, first, an imaging environment is imaged by the imaging unit 30 while the imaging direction is adjusted by the pan and tilt mechanism of the camera device 20, and the captured image data D1 of the imaging environment is acquired by the camera-side controller 34 (S61 in FIG. 16). This captured image data D1 of the imaging environment is transmitted from the camera-side communication unit 36 (S62), is received by the terminal-side communication unit 44 of the terminal device 11 (S63), and is acquired by the terminal-side controller 40.

In the terminal-side controller 40, the pre-search process P5 is performed and the environmental frequency information D6 is acquired (S64).

When the tracking imaging is started, the terminal-side controller 40 acquires the basic tracking information D4 at each imaging timing (see "the first timing" to the "fourth timing" described above) (S65), and performs the resolution determination process P3 to acquire the resolution information D5 on the basis of the basic tracking information D4 and the environmental frequency information D6 (S66).

Seventh Embodiment

In this embodiment, a case where the pre-search process P5 and the resolution determination process P3 are performed in the camera-side controller 34 (the camera device 20) will be described. In this embodiment, detailed description of a configuration that is the same as or similar to that in the fifth embodiment described above will be omitted.

FIG. 17 is a diagram illustrating an example of a process flow from the pre-search process P5 to the resolution determination process P3 according to the seventh embodiment.

In this embodiment, first, an imaging environment is imaged by the imaging unit 30 while the imaging direction is adjusted by the pan and tilt mechanism of the camera device 20, and the captured image data D1 of the imaging environment is acquired by the camera-side controller 34 (S71 in FIG. 17). In the camera-side controller 34, the pre-search process P5 is performed and the environmental frequency information D6 is acquired (S72).

When the tracking imaging is started, the camera-side controller 34 acquires the basic tracking information D4 at each imaging timing (see "the first timing" to the "fourth timing" described above) (S73), and performs the resolution determination process P3 to acquire the resolution information D5 on the basis of the basic tracking information D4 and the environmental frequency information D6 (S74).

Other Modification Examples

Each of the above-described functional configurations can be realized arbitrary hardware, arbitrary software, or a combination of both and can be realized by appropriately combining, for example, a central processing unit (CPU), a volatile random access memory (RAM), a nonvolatile memory such as an electrically erasable programmable read-only memory (EEPROM), and/or various operation programs such as an operating system (OS) or an application program. Further, the present invention can be applied to a program that causes a computer to execute a procedure of various processes regarding the image processing method and the tracking imaging method in each unit of the terminal device 11 and the camera device 20 described above, a computer-readable recording medium (non-transient tangible medium) having the program stored thereon, or a computer in which the program can be installed. In particular, each of the above-described processes in the terminal device 11 may be executed on a dedicated application or may be executed on a browser.

Further, a form of the terminal device 11 of the present invention is not particularly limited, and the terminal device 11 may be constituted by a mobile phone, a smart phone, a tablet terminal, personal digital assistants (PDA), or a portable game machine.

EXPLANATION OF REFERENCES

10: tracking system
11: terminal device
12: housing
13: display
14: operation panel
15: touch panel
16: operation button
17: speaker
18: microphone
19: terminal camera
20: camera device
21: imaging optical system
22: device main body
23: pedestal
24: dome cover
25: holding unit
26: gear
30: imaging unit
32: imaging direction adjustment unit
34: camera-side controller
36: camera-side communication unit
40: terminal-side controller
42: user interface
44: terminal-side communication unit

What is claimed is:

1. A tracking system, comprising:
a camera device including an imaging unit that acquires captured image data, an imaging direction adjustment unit that adjusts an imaging direction of the imaging unit, a camera-side controller that controls the imaging direction adjustment unit on the basis of target information indicating a position of a tracking target, and a camera-side communication unit that is connected to the camera-side controller; and
a terminal device including a terminal-side communication unit that is able to communicate with the camera-side communication unit, a terminal-side controller that is connected to the terminal-side communication unit, and a user interface that is connected to the terminal-side controller,
wherein at least one of the camera-side controller or the terminal-side controller performs a tracking image generation process of generating tracking image data from the captured image data,
at least one of the camera-side controller or the terminal-side controller performs a tracking calculation process of acquiring the target information on the basis of the tracking image data,
the tracking image data is data of an image including a high-resolution region with relatively higher resolution and a low-resolution region with relatively lower resolution,
in the tracking image generation process, basic tracking information including information on at least one of a size or a speed of the tracking target is acquired, the high-resolution region and the low-resolution region are determined on the basis of the basic tracking information, and the tracking image data is generated, and
the tracking image generation process and the tracking calculation process are performed in parallel.

2. The tracking system according to claim 1,
wherein at least a portion of the tracking calculation process of acquiring the target information indicating the position of the tracking target at a first timing on the basis of the tracking image data generated from the captured image data acquired at the first timing is performed simultaneously with at least a portion of the tracking image generation process of generating the tracking image data that is used to acquire the target information indicating the position of the tracking target at a second timing after the first timing, from the captured image data acquired at the second timing.

3. The tracking system according to claim 1,
wherein the tracking image generation process and the tracking calculation process are performed in one of the camera-side controller and the terminal-side controller.

4. The tracking system according to claim 1,
wherein one of the tracking image generation process and the tracking calculation process is performed in one of the camera-side controller and the terminal-side controller, and the other of the tracking image generation process and the tracking calculation process is performed in the other of the camera-side controller and the terminal-side controller.

5. The tracking system according to claim 1,
wherein the tracking calculation process is performed by both of the camera-side controller and the terminal-side controller, and
a controller having a relatively higher processing capability between the camera-side controller and the terminal-side controller performs the tracking calculation process of the high-resolution region, and a controller having a relatively lower processing capability between the camera-side controller and the terminal-side controller performs the tracking calculation process of the low-resolution region.

6. The tracking system according to claim 1,
wherein at least one of the camera-side controller or the terminal-side controller performs a pre-search process of acquiring a spatial frequency of the captured image data of at least a portion of the imaging range of the camera device, and
in the tracking image generation process, resolution of the tracking image data is determined on the basis of the spatial frequency acquired through the pre-search process.

7. The tracking system according to claim 6,
wherein in the tracking image generation process, in a case where the spatial frequency acquired through the pre-search process is relatively low, resolution of the tracking image data is set to be lower than in a case where the spatial frequency is relatively high.

8. A terminal device that is connectable to a camera device including an imaging unit that acquires captured image data, an imaging direction adjustment unit that adjusts an imaging direction of the imaging unit, a camera-side controller that controls the imaging direction adjustment unit on the basis of target information indicating a position of a tracking target, and a camera-side communication unit that is connected to the camera-side controller, the terminal device comprising:
a terminal-side communication unit that is able to communicate with the camera-side communication unit;
a terminal-side controller that is connected to the terminal-side communication unit; and
a user interface connected to the terminal-side controller,
wherein at least one of the camera-side controller or the terminal-side controller performs a tracking image generation process of generating tracking image data from the captured image data,
the terminal-side controller performs a tracking calculation process of acquiring the target information on the basis of the tracking image data, and transmits the target information to the camera-side controller via the terminal-side communication unit and the camera-side communication unit,
the tracking image data is data of an image including a high-resolution region with relatively higher resolution and a low-resolution region with relatively lower resolution,
in the tracking image generation process, basic tracking information including information on at least one of a size or a speed of the tracking target is acquired, the high-resolution region and the low-resolution region are determined on the basis of the basic tracking information, and the tracking image data is generated, and the tracking image generation process and the tracking calculation process are performed in parallel.

9. A camera device connectable to a terminal device including a terminal-side communication unit, a terminal-side controller that is connected to the terminal-side communication unit, and a user interface that is connected to the terminal-side controller, the camera device comprising:
an imaging unit that acquires the captured image data;
an imaging direction adjustment unit that adjusts an imaging direction of the imaging unit; and
a camera-side controller that controls the imaging direction adjustment unit on the basis of target information indicating a position of the tracking target, the camera-side controller performing a tracking image generation process of generating tracking image data from the captured image data and a tracking calculation process of acquiring the target information on the basis of the tracking image data in parallel,
wherein the tracking image data is data of an image including a high-resolution region with relatively higher resolution and a low-resolution region with relatively lower resolution, and
in the tracking image generation process, basic tracking information including information on at least one of a size or a speed of the tracking target is acquired, the high-resolution region and the low-resolution region are determined on the basis of the basic tracking information, and the tracking image data is generated.

10. A tracking imaging method of a tracking system comprising a camera device including an imaging unit that acquires captured image data, an imaging direction adjustment unit that adjusts an imaging direction of the imaging unit, a camera-side controller that controls the imaging direction adjustment unit on the basis of target information indicating a position of a tracking target, and a camera-side communication unit that is connected to the camera-side controller, and a terminal device including a terminal-side communication unit that is able to communicate with the camera-side communication unit, a terminal-side controller that is connected to the terminal-side communication unit, and a user interface that is connected to the terminal-side controller, the tracking imaging method comprising:
a step of performing a tracking image generation process of generating tracking image data from the captured image data by at least one of the camera-side controller or the terminal-side controller; and
a step of performing a tracking calculation process of acquiring the target information on the basis of the tracking image data by at least one of the camera-side controller or the terminal-side controller,
wherein the tracking image data is data of an image including a high-resolution region with relatively higher resolution and a low-resolution region with relatively lower resolution,
in the tracking image generation process, basic tracking information including information on at least one of a size or a speed of the tracking target is acquired, the high-resolution region and the low-resolution region are determined on the basis of the basic tracking information, and the tracking image data is generated, and
the tracking image generation process and the tracking calculation process are performed in parallel.

11. A computer-readable non-transitory tangible medium having a program recorded thereon, the program for controlling a tracking system comprising a camera device including an imaging unit that acquires captured image data, an imaging direction adjustment unit that adjusts an imaging direction of the imaging unit, a camera-side controller that controls the imaging direction adjustment unit on the basis of target information indicating a position of a tracking target, and a camera-side communication unit that is connected to the camera-side controller, and a terminal device including a terminal-side communication unit that is able to communicate with the camera-side communication unit, a terminal-side controller that is connected to the terminal-side communication unit, and a user interface that is connected to the terminal-side controller, the program causing a computer to execute:

a step of performing a tracking image generation process of generating tracking image data from the captured image data by at least one of the camera-side controller or the terminal-side controller; and a step of performing a tracking calculation process of acquiring the target information on the basis of the tracking image data by at least one of the camera-side controller or the terminal-side controller, wherein the tracking image data is data of an image including a high-resolution region with relatively higher resolution and a low-resolution region with relatively lower resolution, in the tracking image generation process, basic tracking information including information on at least one of a size or a speed of the tracking target is acquired, the high-resolution region and the low-resolution region are determined on the basis of the basic tracking information, and the tracking image data is generated, and the tracking image generation process and the tracking calculation process are performed in parallel.

\* \* \* \* \*